United States Patent
Lee et al.

(10) Patent No.: US 12,254,330 B2
(45) Date of Patent: Mar. 18, 2025

(54) ELECTRONIC DEVICE AND METHOD FOR CONTROLLING EXECUTION OF APPLICATION BASED ON EXECUTION SEQUENCE OF APPLICATIONS

(71) Applicant: Samsung Electronics Co., Ltd., Suwon-si (KR)

(72) Inventors: Younggyun Lee, Suwon-si (KR); Wontaek Kim, Suwon-si (KR); Changmin Choi, Suwon-si (KR); Yonggil Han, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 18/156,798

(22) Filed: Jan. 19, 2023

(65) Prior Publication Data
US 2023/0367612 A1   Nov. 16, 2023

Related U.S. Application Data

(63) Continuation of application No. PCT/KR2023/000744, filed on Jan. 16, 2023.

(30) Foreign Application Priority Data

May 13, 2022   (KR) .................. 10-2022-0059090

(51) Int. Cl.
*G06F 3/0488*  (2022.01)
*G06F 3/0482*  (2013.01)
*G06F 9/451*   (2018.01)

(52) U.S. Cl.
CPC ........... *G06F 9/451* (2018.02); *G06F 3/0482* (2013.01)

(58) Field of Classification Search
CPC .................. G06F 9/451; G06F 3/0482; G06F 2203/04803
See application file for complete search history.

(56) References Cited

U.S. PATENT DOCUMENTS 8,601,579 B2   12/2013   Krstic et al.
8,638,925 B1 *  1/2014   Billman .............. H04M 3/5191
                                                379/265.14
(Continued)

FOREIGN PATENT DOCUMENTS

CN       113378154 A    9/2021
KR   10-2012-0089986 A  8/2012
(Continued)

OTHER PUBLICATIONS

International Search Report dated Apr. 18, 2023, issued in International Application No. PCT/KR2023/000744.

*Primary Examiner* — Hien L Duong
(74) *Attorney, Agent, or Firm* — Jefferson IP Law, LLP

(57) ABSTRACT

An electronic device displays a first screen is provided. The electronic device includes a list of one or more second applications in a display based on a first application, the second applications being different from the first application. The electronic device displays, in response to a first input of selecting one application of the one or more second applications based on the list, a second screen based on execution of the selected application in the display. The electronic device identifies information indicating at least one application switchable from the second screen within the first application, in response to a second input executing a third application based on the second screen. The electronic device identifies whether to switch from the second screen to a third screen based on execution of the third application to initiate the execution of the third application.

20 Claims, 10 Drawing Sheets

(56) References Cited

U.S. PATENT DOCUMENTS

| | | | |
|---|---|---|---|
| 10,003,599 B2 | 6/2018 | Shi et al. | |
| 10,146,517 B2 | 12/2018 | Lim et al. | |
| 10,409,967 B2 | 9/2019 | Ahn | |
| 10,558,546 B2 | 2/2020 | Cranfill et al. | |
| 10,884,536 B2* | 1/2021 | Lee | H04M 1/724 |
| 11,921,993 B2* | 3/2024 | Tyler | G06F 3/0483 |
| 2012/0079586 A1* | 3/2012 | Brown | H04L 63/108 |
| | | | 726/16 |
| 2013/0125055 A1* | 5/2013 | Nakaya | G06F 8/61 |
| | | | 715/810 |
| 2013/0227675 A1* | 8/2013 | Fujioka | G06F 9/451 |
| | | | 726/16 |
| 2014/0068755 A1* | 3/2014 | King | G06F 3/04883 |
| | | | 726/19 |
| 2014/0148126 A1* | 5/2014 | Kim | H04M 1/72448 |
| | | | 455/411 |
| 2014/0283135 A1 | 9/2014 | Shepherd et al. | |
| 2014/0344951 A1 | 11/2014 | Brewer | |
| 2016/0103668 A1* | 4/2016 | Srinivasan | G06F 8/61 |
| | | | 717/178 |
| 2016/0188163 A1* | 6/2016 | Lau | H04W 4/02 |
| | | | 715/744 |
| 2016/0274741 A1* | 9/2016 | Kawai | G06F 9/4806 |
| 2016/0351168 A1* | 12/2016 | Yan | G09G 5/14 |
| 2017/0041455 A1* | 2/2017 | Hong | G06F 3/04842 |
| 2017/0046025 A1* | 2/2017 | Dascola | G06F 3/016 |
| 2017/0149795 A1* | 5/2017 | Day, II | H04W 4/02 |
| 2019/0324628 A1* | 10/2019 | Kim | G06Q 10/10 |
| 2019/0347181 A1* | 11/2019 | Cranfill | G06F 11/3013 |
| 2020/0110529 A1* | 4/2020 | Gao | G06F 3/0486 |
| 2020/0310771 A1* | 10/2020 | Lu | G06F 3/0482 |
| 2020/0326842 A1* | 10/2020 | Lemay | G06F 1/3265 |
| 2021/0342147 A1* | 11/2021 | Singh | G06F 9/451 |
| 2021/0342422 A1* | 11/2021 | Matsunaga | G06Q 10/02 |
| 2022/0083642 A1* | 3/2022 | Wu | G06F 21/45 |
| 2022/0197482 A1* | 6/2022 | Zhu | G06F 3/0481 |

FOREIGN PATENT DOCUMENTS

| | | |
|---|---|---|
| KR | 10-1291123 B1 | 7/2013 |
| KR | 10-1464190 B1 | 11/2014 |
| KR | 10-2015-0087099 A | 7/2015 |
| KR | 10-2015-0101689 A | 9/2015 |
| KR | 10-1565230 B1 | 10/2015 |
| KR | 10-1578541 B1 | 12/2015 |
| KR | 10-2320151 B1 | 10/2021 |
| KR | 10-2333425 B1 | 11/2021 |

* cited by examiner

ELECTRONIC DEVICE AND METHOD FOR CONTROLLING EXECUTION OF APPLICATION BASED ON EXECUTION SEQUENCE OF APPLICATIONS

CROSS-REFERENCE TO RELATED APPLICATION(S)

This application is a continuation application, claiming priority under § 365 (c), of an International application No. PCT/KR2023/000744, filed on Jan. 16, 2023, which is based on and claims the benefit of a Korean patent application number 10-2022-0059090, filed on May 13, 2022, in the Korean Intellectual Property Office, the disclosure of which is incorporated by reference herein in its entirety.

TECHNICAL FIELD

The disclosure relates to an electronic device and a method for controlling execution of an application based on an execution sequence of applications.

BACKGROUND ART

Currently, a service for protecting children from content provided through an electronic device such as a smart television (TV) or a set-top box (STB) and a smartphone is being developed. For example, the electronic device may provide a kids mode for children. The kids mode may be a mode for preventing content harmful to children using the electronic device from being provided. For example, content with brutal violence or content with suggestiveness may not be provided in the kids mode.

The above information is presented as background information only to assist with an understanding of the disclosure. No determination has been made, and no assertion is made, as to whether any of the above might be applicable as prior art with regard to the disclosure.

DISCLOSURE

Technical Solution

In accordance with an aspect of the disclosure, an electronic device is provided. The electronic device includes a display, a memory for storing instructions, and at least one processor operably coupled to the display and the memory. The at least one processor may be, when the instructions are executed, configured to display a first screen including a list of one or more second applications in the display based on a first application, the second applications being different from the first application. The at least one processor may be, when the instructions are executed, configured to display, in response to a first input of selecting one application of the one or more second applications based on the list, a second screen based on execution of the selected application in the display. The at least one processor may be, when the instructions are executed, configured to identify information indicating at least one application switchable from the second screen within the first application, in response to a second input executing a third application based on the second screen. The at least one processor may be, when the instructions are executed, configured to identify whether to switch from the second screen to a third screen based on execution of the third application, based on the information. The at least one processor may be, when the instructions are executed, configured to initiate the execution of the third application, based on identification of switching from the second screen to the third screen.

In accordance with another aspect of the disclosure, a method of an electronic device is provided. The method includes based on a first application, displaying a first screen including a list of one or more second applications in a display, the second applications being distinct from the first application. The method of an electronic device may include displaying, in response to a first input of selecting one application of the one or more second applications based on the list, a second screen based on execution of the selected application in the display. The method of an electronic device may include identifying information indicating at least one application switchable from the second screen within the first application, in response to a second input executing a third application based on the second screen. The method of an electronic device may include identifying whether to switch from the second to a third screen based on the execution of the third application, based on the information. The method of an electronic device may include initiating the execution of the third application, based on identifying switching from the second screen to the third screen.

In accordance with another aspect of the disclosure, an electronic device is provided. The electronic device includes a display, a memory for storing instructions, and at least one processor operably coupled to the display and the memory. The at least one a processor, when the instructions are executed, may be configured to display a first screen based on execution of a first application among a plurality of applications in the display. The at least one a processor, when the instructions are executed, may be configured to receive a first input for executing a second application distinct from the first application, based on the displayed first screen. The at least one a processor, when the instructions are executed, may be configured to, within a first state for monitoring a sequence in which the plurality of applications is executed, obtain information indicating the sequence from the memory, in response to the first input. The at least one a processor, when the instructions are executed, may be configured to replace the first screen displayed in the display with a second screen based on execution of the second application, based on permission to switch from the first application to the second application from the obtained information. The at least one a processor, when the instructions are executed, may be configured to display the second screen independently of the information in a second state distinct from the first state.

In accordance with another aspect of the disclosure, a method of an electronic device is provided. The method includes displaying a first screen based on execution of a first application among a plurality of applications in the display. The method of an electronic device may include receiving a first input for executing a second application distinct from the first application, based on the displayed first screen. The method of an electronic device may include, within a first state for monitoring a sequence in which the plurality of applications is executed, obtaining information indicating the sequence from the memory, in response to the first input. The method of an electronic device may include replacing the first screen displayed in the display with a second screen based on execution of the second application, based on permission to switch from the first application to the second application from the obtained information. The method of an electronic device may include displaying the second screen independently of the information in a second state distinct from the first state.

DESCRIPTION OF THE DRAWINGS

The above and other aspects, features, and advantages of certain embodiments of the disclosure will be more apparent from the following description taken in conjunction with the accompanying drawings, in which.

Throughout the drawings, it should be noted that like reference numbers are used to depict the same or similar elements, features, and structures.

MODE FOR INVENTION

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Figure 1:
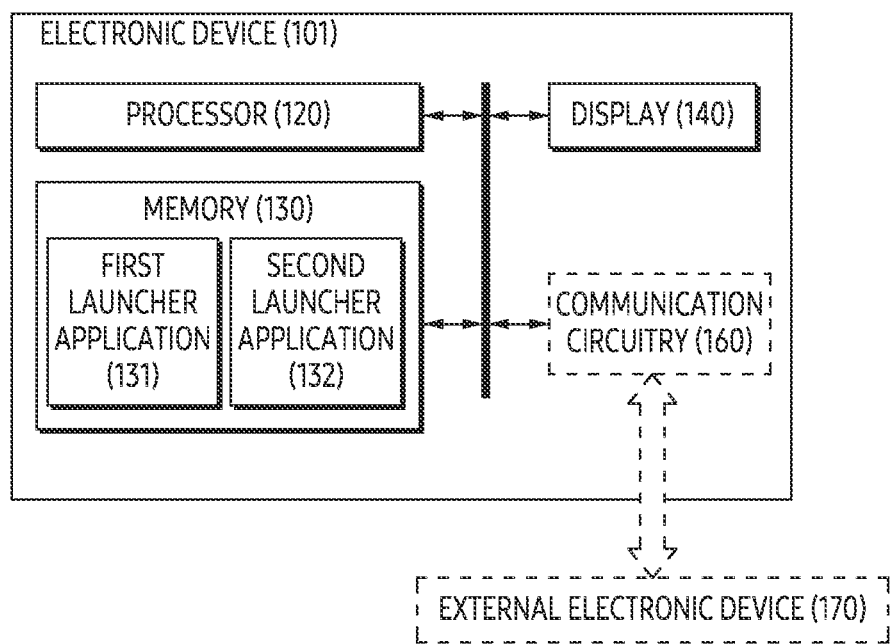
FIG. 1 is an example block diagram of an electronic device according to an embodiment of the disclosure.

FIG. 1 is an example block diagram of an electronic device 101 according to an embodiment of the disclosure.

Referring to FIG. 1, the electronic device 101 according to an embodiment may include a processor 120, a memory 130, a display 140, or a communication circuitry 160. The processor 120, the memory 130, the display 140, and the communication circuitry 160 may be electrically and/or operably coupled with each other by an electronic component such as e.g., a communication bus. The types and/or the number of hardware components included in the electronic device 101 are not limited to those illustrated in FIG. 1. For example, the electronic device 101 may include only some of the hardware components illustrated in FIG. 1.

The processor 120 of the electronic device 101 according to an embodiment may include a hardware component for processing data based on one or more instructions. The hardware component for processing data may include, for example, an arithmetic and logic unit (ALU), a field programmable gate array (FPGA), and/or a central processing unit (CPU). The number of the processors 120 may be one or more. For example, the processor 120 may have a structure of a multi-core processor such as a dual-core, a quad-core, or a hexa-core.

The memory 130 of the electronic device 101 according to an embodiment may include a hardware component for storing data and/or instructions input and/or output to/from the processor 120. The memory 130 may include, for example, a volatile memory such as a random-access memory (RAM) and/or a non-volatile memory such as a read-only memory (ROM). The volatile memory may include at least one of, for example, a dynamic RAM (DRAM), a static RAM (SRAM), a cache RAM, or a pseudo SRAM (PSRAM). The nonvolatile memory may include, for example, at least one of a programmable ROM (PROM), an erasable PROM (EPROM), an electrically erasable PROM (EEPROM), a flash memory, a hard disk, a compact disk, or an embedded multi-media card (eMMC).

In the memory 130 of the electronic device 101 according to an embodiment may be stored one or more instructions indicating an operation to be performed by the processor 120. A set of instructions may be referred to as firmware, operating system, process, routine, sub-routine, and/or application. For example, the electronic device 101 and/or the processor 120 of the electronic device 101 may perform at least one of the operations of FIGS. 2 to 7, by executing a set of a plurality of instructions distributed in the form of an application.

Referring to FIG. 1, some of applications stored in the memory 130 of the electronic device 101 according to an embodiment are conceptually illustrated. The application may be an example of a program performing a specific function in the electronic device 101. The application may be divided into a preload application and/or a third party application. The preload application may be an example of an application stored in the electronic device 101 to use the electronic device 101. The third party application may be an example of an application installed by a user while the user of the electronic device 101 uses the electronic device 101.

For example, a first launcher application 131 and a second launcher application 132 may be stored and/or installed in the memory 130 of the electronic device 101. Hereinafter, an application being installed in the electronic device 101 may mean that one or more instructions provided in the form of an application are stored in the memory 130 of the electronic device 101, and that the one or more instructions are stored in a format (e.g., a file having an extension designated by an operating system of the electronic device 101) executable by the processor 120 of the electronic device 101.

The first launcher application 131 and/or the second launcher application 132 according to an embodiment may be an application capable of executing at least one application in a state of being executed by the processor 120 of the electronic device 101. For example, an execution screen of the first launcher application 131 and/or the second launcher application 132 may be referred to as a launcher screen, a home screen, or a menu screen. The first launcher application 131 and/or the second launcher application 132 may include at least part of an execution screen or a lock screen of an application. The launcher applications 131 and 132 may display a home screen displaying various icons corresponding to the applications, wherein each icon may include an icon image.

The electronic device 101 may launch applications different from the launcher applications 131 and 132, through the first launcher application 131 and/or the second launcher application 132. The launcher applications 131 and 132 may include a set of instructions executed by the electronic device 101. The first launcher application 131 and/or the second launcher application 132 may be included in the operating system of the electronic device 101. The launcher applications 131 and 132 according to an embodiment may be provided by a program developer different from a user of the electronic device 101. For example, the electronic device 101 may cause the user of the electronic device 101 to install at least one of the launcher applications 131 and 132. The first launcher application 131 and/or the second launcher application 132 may be an example of an application.

The electronic device 101 according to an embodiment may search for instructions corresponding to one or more applications stored in the electronic device 101 from the memory 130 of the electronic device 101, using the first launcher application 131 and/or the second launcher application 132. The instructions may refer to instructions instructed by the processor 120. The electronic device 101 according to an embodiment may execute a plurality of applications, using the first launcher application 131 and/or the second launcher application 132. For example, the number of applications executable by the electronic device 101 using the second launcher application 132 may be greater than the number of applications executable using the first launcher application 131. For example, the electronic device 101 may refrain from executing at least some of the applications stored in the memory 130 of the electronic device 101, using the first launcher application 131.

The display 140 of the electronic device 101 according to an embodiment may output visualized information to the user. For example, the display 140 may be controlled by a controller such as the processor 120 and/or a graphic processing unit (GPU) to output visualized information to the user. The display 140 may include a flat panel display (FPD) and/or electronic paper. The FPD may include a liquid crystal display (LCD), a plasma display panel (PDP), and/or one or more light emitting diodes (LEDs). The LED may include an organic LED (OLED).

According to an embodiment, the display 140 may further include at least one sensor (e.g., fingerprint sensor, iris sensor, pressure sensor, or illuminance sensor), or a control circuit for the at least one sensor. In such a case, the at least one sensor or the control circuit therefor may be embedded into part of the display 140. For example, when the sensor embedded into the display 140 includes a biometric sensor (e.g., a fingerprint sensor), the biometric sensor may obtain biometric information (e.g., a fingerprint image) associated with a touch input through a partial area of the display 140. For example, when the sensor embedded into the display 140 includes a pressure sensor, the pressure sensor may obtain pressure information associated with a touch input through a partial area or an entire area of the display 140. According to an embodiment, the sensor may be disposed between pixels of a pixel layer of the display 140, or above or below the pixel layer. For example, the sensor may be arranged in at least part of the housing of the electronic device 101.

The communication circuitry 160 of the electronic device 101 according to an embodiment may include a hardware component for supporting transmission and/or reception of electrical signals between the electronic device 101 and an external electronic device. The communication circuitry 160 may include, for example, at least one of a modem, an antenna, or an optical/electronic (O/E) converter. The communication circuitry 160 may support transmission and/or reception of electrical signals based on various types of protocols such as e.g., Ethernet, Local Area Network (LAN), Wide Area Network (WAN), Wi-Fi, Bluetooth, Bluetooth Low Energy (BLE), ZigBee, Long Term Evolution (LTE), fifth generation (5G) New Radio (NR) or the like.

A situation is illustrated in which the electronic device 101 and an external electronic device 170 according to an embodiment are connected to each other based on a wired network and/or a wireless network. The wired network may include a network such as e.g., Internet, LAN, WAN, Ethernet, or a combination thereof. The wireless network may include a network such as e.g., LTE, 5G NR, Wi-Fi, Zigbee, Near Field Communication (NFC), Bluetooth, Bluetooth Low-Energy (BLE), or a combination thereof. Although the electronic device 101 and the external electronic device 170 are illustrated as being directly connected, the electronic device 101 and the external electronic device 170 may be indirectly connected via one or more routers and/or access points (APs).

Figure 2:
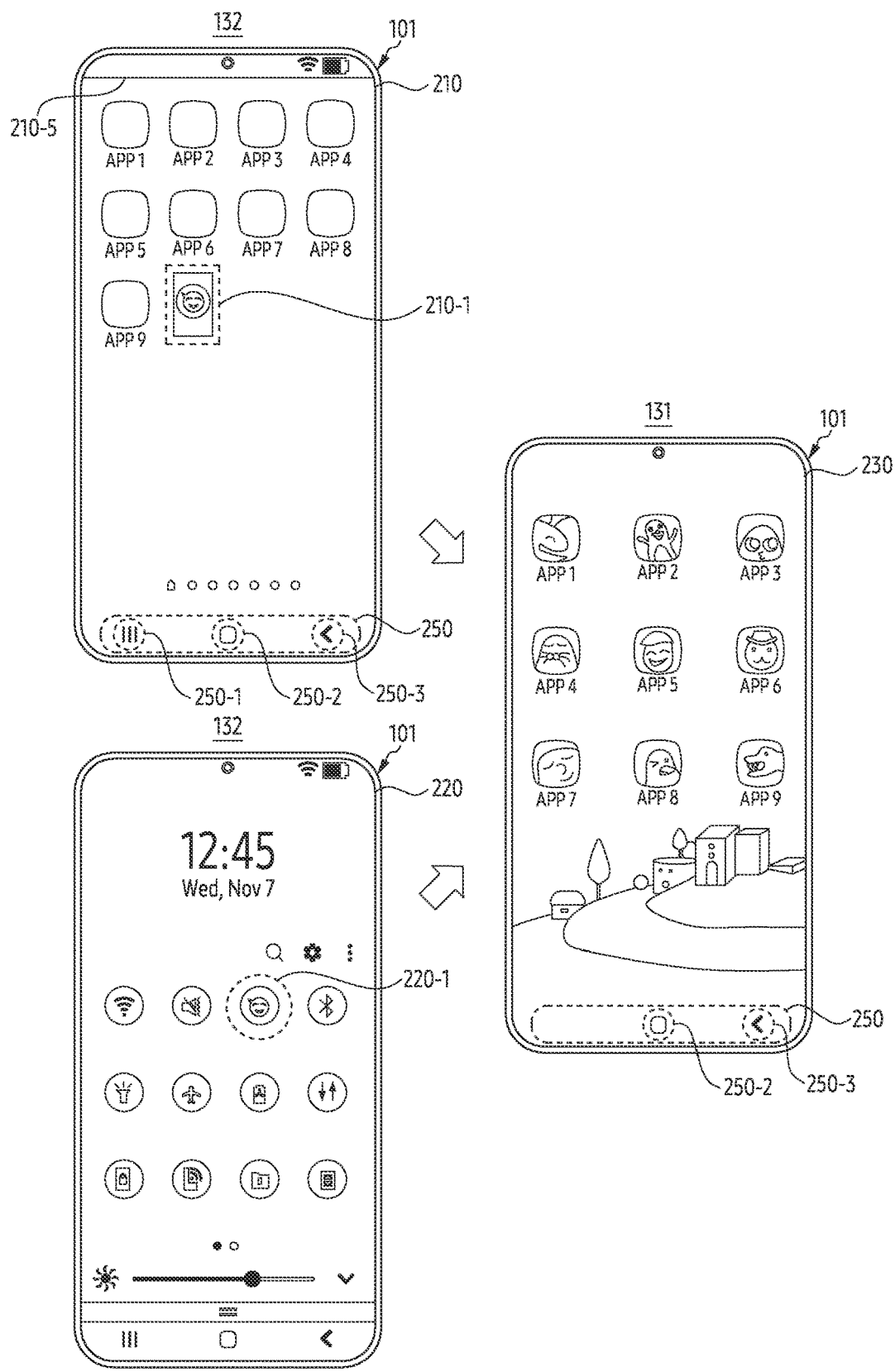
FIG. 2 is an example diagram for describing an operation of an electronic device switching from a second launcher application to a first launcher application, according to an embodiment of the disclosure.

FIG. 2 is an example diagram illustrating an operation of switching from the second launcher application 132 to the first launcher application 131 by the electronic device according to an embodiment of the disclosure. The electronic device 101 may be referred to as the electronic device 101 of FIG. 1.

Referring to FIG. 2, illustrated are screens 210, 220, and 230 displayed on a display (e.g., the display 140 of FIG. 1) by the electronic device 101 according to an embodiment using the first launcher application 131 and/or the second launcher application 132. The screens 210, 220, and 230 may refer to a user interface (UI) displayed in at least a portion of the display. The screens 210, 220, and 230 may have an activity of an Android operating system. The electronic device 101 may display at least one content using at least one of the screens 210, 220, and 230.

The electronic device 101 according to an embodiment may display the screen 210 and/or the screen 220 on the display, using the second launcher application 132. For example, the screen 210 may be an example of a home screen that is an execution screen of the second launcher application 132 of the electronic device 101. The screen 230 may be an example of a home screen displayed by the first launcher application 131. The electronic device 101 may further provide, in the home screen displayed on the display, additional pages including one or more widget areas and/or one or more icons (or applications) within a predetermined maximum number of pages. For example, the electronic device 101 may switch the pages by a designated touch input.

According to an embodiment, when the electronic device 101 is powered on, the electronic device 101 may display the screen 210 by the second launcher application 132 on the display. For example, the electronic device 101 may display a tray including a background screen, icons for executing applications, and/or a thumbnail image of an application allowed to be executed within the launcher applications 131 and 132, in the screens 210 and 230. For example, the electronic device 101 may display the screens 210 and 230 in multiple views (or screens or pages), depending on a size of the display.

The electronic device 101 according to an embodiment may display icons of applications stored in the electronic device 101 in the screen 210. For example, the electronic device 101 may change the number and/or type of icons displayed on the display, in the screen 210. The electronic device 101 may display a navigation bar 250 at a lower end of the display, in the screen 210. The electronic device 101 may adjust the display of the navigation bar 250. For example, the electronic device 101 may cease displaying the navigation bar 250, in response to execution of at least one application in the launcher applications 131 and 132.

The electronic device 101 according to an embodiment may execute an application different from the launcher applications 131 and 132, in the execution state of the first launcher application 131 and/or the second launcher application 132. For example, the electronic device 101 may execute the different application, while the second launcher application 132 is executed. The electronic device 101 may change a state of the screen based on the different applications, using the navigation bar 250. The navigation bar 250 may include at least one of a menu button 250-1, a home button 250-2, and/or a back button 250-3. For example, the electronic device 101 may provide a connection menu that can be displayed on the display using the menu button 250-1. The connection menu may include menus for widget addition, wallpaper change, search, editing, and/or environment setting.

When a plurality of applications are executed, the electronic device 101 according to an embodiment may display trays of the plurality of applications being executed, in response to an input of selecting the menu button 250-1. The trays of the applications may be arranged in the sequence that the applications are executed. The electronic device 101 according to an embodiment may receive an input for selecting the home button 250-2 in a state that a screen different from the screen 210 and/or a screen based on a different application is/are displayed on the display. The electronic device 101 may display a home screen (e.g., the screen 210) of the second launcher application 132, in response to the input.

The electronic device 101 according to an embodiment may display a previously stacked screen of the screen displayed on the display, using the back button 250-3. For example, the electronic device 101 may execute an application different from the second launcher application 132, while displaying the screen 210 by the second launcher application 132. Based on the execution of the different application, the electronic device 101 may display an execution screen based on the different application on the display. The screen stacked before the execution screen based on the different applications may be the screen 210. The electronic device 101 may cease displaying the screen based on the execution of the different application, in order to display the screen 210, which is the stacked screen, on the display using the back button 250-3. For example, in response to an input of selecting the back button 250-3, in the execution state of the second launcher application, the electronic device 101 may terminate the execution state of the different application executed. The electronic device 101 may include the navigation bar 250 in the screen 230 based on the first launcher application 131.

The electronic device 101 according to an embodiment may receive an input for selecting the home button 250-2, in a state that a screen different from the screen 230 and/or a screen based on the different application, which is allowed to be executed by the first launcher application, is/are displayed on the display. The electronic device 101 may display the screen 230 of the first launcher application 131, in response to the input. The electronic device 101 according to an embodiment may receive an input of clicking (or touching) at least one icon in the screen 210 or the screen 220. For example, the electronic device 101 may execute the application in response to an input of touching (or clicking) an icon matching a corresponding application. The electronic device 101 may display a screen based on execution of the application on the display. For example, the electronic device 101 may display an icon 210-1 corresponding to the first launcher application 131 in the screen 210, on the display. The electronic device 101 may execute the first launcher application 131 upon receiving an input of touching the icon 210-1. Further, for example, the electronic device 101 may display an icon 220-1 corresponding to the first launcher application 131 on the display, in the screen 220. The electronic device 101 may execute the first launcher application 131 upon receiving the input of touching the icon 220-1.

According to an embodiment, the electronic device 101 may display the screen 230 on the display, in response to execution of the first launcher application 131. The screen 230 may be an example of a home screen based on the first launcher application 131. For example, although not illustrated, the electronic device 101 may display a screen for inputting user information to execute the first launcher application 131. An operation in which the electronic device displays a screen for inputting the user information will be described later with reference to FIG. 7.

The electronic device 101 according to an embodiment may receive an input of touching and/or scrolling an upper portion (e.g., a state bar 210-5) of the display in the screen 210, to display the screen 220 on the display. In the screen 220, the electronic device 101 may display a signal strength indicator(s) for wireless communication such as e.g., cellular communication (e.g., LTE, LTE-advanced (LTE-A)) or Wi-Fi, a Bluetooth connection mode, a received message, a battery state indicator, and/or visual objects (or icons) corresponding to time, on the display. However, the disclosure is not limited to the above-described embodiment.

The electronic device 101 according to an embodiment may change a color of an icon so as to display an active state of an application corresponding to the icon (e.g., the icon 220-1) in the screen 220. The electronic device 101 may change the type and/or number of icons displayed on the screen 220. The electronic device 101 according to an embodiment may execute the first launcher application 131, in response to an input of selecting the icon 220-1. For example, the execution screen and/or the home screen of the first launcher application 131 may be referred to as the screen 230.

The electronic device 101 according to an embodiment may restrict displaying of the menu button 250-1 among the buttons included in the navigation bar 250 in the screen 230. For example, the electronic device 101 may remove displaying of the status bar 210-5 from the screen 230 on the display. For example, the electronic device 101 may stop executing at least some of the plurality of applications stored in the electronic device 101, while the first launcher application 131 is executed. While the first launcher application 131 is executed, the electronic device 101 may display the menu button 250-1 and/or the status bar 210-5 to cease execution of the plurality of applications.

As described above, the electronic device may perform switching from at least one launcher application to another launcher application different from the at least one launcher application. The different launcher application may restrictively allow execution of multiple applications stored in the electronic device. An operation that the electronic device restrictively allows execution of a plurality of applications will be described later with reference to FIGS. 3 to 10.

Figure 3:
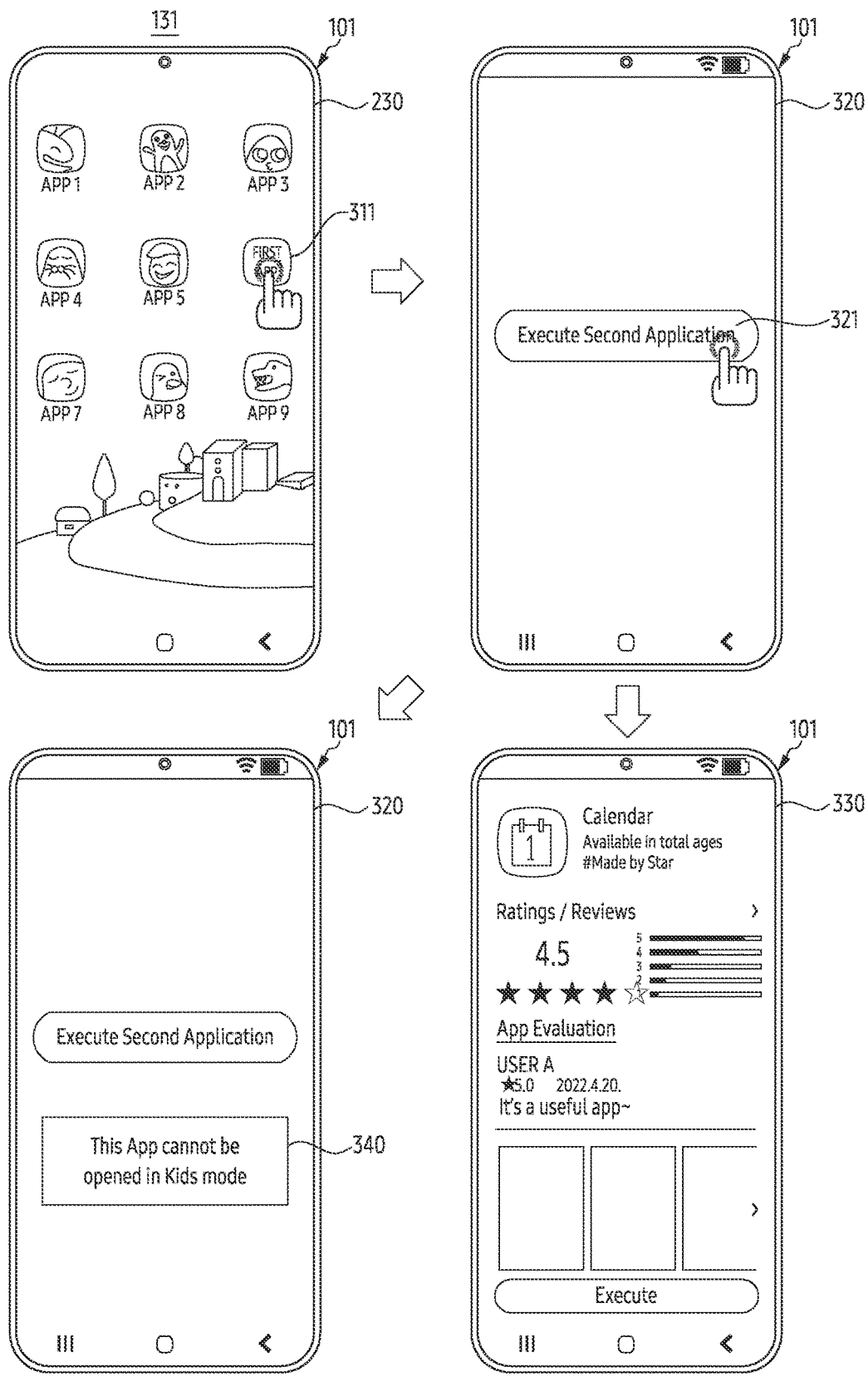
FIG. 3 is an example diagram for describing an operation of allowing or ceasing execution of the second application based on the first application, while a first launcher application is executed by using information in an electronic device according to an embodiment of the disclosure.

FIG. 3 is an example diagram for describing an operation that the electronic device uses the information to allow or cease the execution of the second application 321, based on the first application 311, while the first launcher application 131 is executed according to an embodiment of the disclosure. The electronic device 101 may be referred to as the electronic device 101 of FIG. 1. The screen 230 in the screen 230 may be referred to as the screen 230 of FIG. 2. The electronic device 101 may display an icon (or a visual object) corresponding to one or more applications on a display (e.g., the display 140 of FIG. 1). The electronic device 101 may use the user information to change the number and/or type of icons included in the screen 230. For example, the electronic device 101 may allow execution of the one or more applications, based on the first launcher application 131.

The electronic device 101 according to an embodiment may receive an input of touching the first application 311, in the screen 230. The electronic device 101 may execute the first application 311 in response to an input of touching the icon of the first application 311. The first application 311 may be an example of an application that is allowed to be executed, in the first launcher application 131. For example, in the execution state of the first launcher application 131, the electronic device 101 may add an icon for the first application 311, which can be executed in the second launcher application 132, by user authentication. For example, the electronic device 101 may allow execution of the first application 311 in the execution state of the first launcher application 131.

The electronic device 101 according to an embodiment may display a screen 320 based on the first application 311 on the display. The screen 320 may be an example of the execution screen of the first application 311. For example, the screen 320 may be an example of a menu screen included in the first application 311. For example, the screen 320 may be an example of a screen for displaying information of the first application 311. However, the disclosure is not limited to the above-described embodiment. The electronic device 101 may receive an input for executing the second application 321 based in the screen 320. For example, the electronic device 101 may receive an input of touching a visual object (e.g., an icon of the second application 321) included in the screen 320.

The electronic device 101 according to an embodiment may allow execution of the second application 321, using at least some of information stored in a memory (e.g., the memory 130 of FIG. 1). For example, the electronic device 101 may display the screen 330 on the display, in response to an input for executing the second application 321 (e.g., an input of selecting a visual object matching the second application 321 included in the screen 320). For example, the screen 330 may be an example of the execution screen of the second application 321. For example, the electronic device 101 may switch from the second application 321 to another application based on the screen 330.

The electronic device 101 according to an embodiment may cease executing the second application 321, using at least some of information stored in the memory. For example, the electronic device 101 may display a pop-up window 340 on the display in response to an input of selecting the second application 321 included in the screen 320.

The electronic device 101 according to an embodiment may display the pop-up window 340 on a portion of the display. For example, the electronic device 101 may display the pop-up window 340, overlapping on the screen 320. The electronic device 101 may display the pop-up window 340 to be distinguished from the screen 330. For example, the electronic device 101 may change the color of the pop-up window 340. For example, the electronic device 101 may display the pop-up window 340 as a pop-up window 340 having transparency. The electronic device 101 may change the transparency of the pop-up window 340. The electronic device 101 may display the pop-up window 340, overlapping on the screen 330 for a specified time. The electronic device 101 may display the size of the pop-up window 340 to be smaller than a size of the screen 320. The pop-up window 340 according to an embodiment may include at least one text. The electronic device 101 may provide the user with information for refraining from executing the second application 321 (e.g., "This application cannot be executed in a Kids mode"), using the text included in the pop-up window 340.

In the electronic device 101 according to an embodiment, when execution of another application (e.g., the second application 321) is allowed by the first launcher application 131, the screen 330 may be displayed. When the execution of another application is restricted by the first launcher application 131, the electronic device 101 may display the pop-up window 340. For example, the electronic device 101 may include information on applications that an execution is allowed and/or restricted by the first launcher application 131.

At least some of information stored in the memory (e.g., the memory 130 of FIG. 1) according to an embodiment may be an example of information included in the first launcher application 131. For example, the information may include a list of one or more applications allowed to be executed in the first launcher application 131. For example, the electronic device 101 may update the first launcher application 131 to change the list of applications. For example, the at least one some of information may include sequence information for allowing and/or restricting execution of another application based on one executed application, in the first launcher application 131. For example, the electronic device 101 may adjust execution of the second application 321 using the sequence information. As described above, the electronic device 101 may use at least some of the information to identify whether to execute an application. Based on the identifying, the electronic device 101 may cease executing at least one application by the first launcher application. The electronic device 101 may cease executing the at least one application to prevent contents and/or applications harmful to children from being executed. An operation that an electronic device stores at least some of information in the memory and/or loads the at least some of information from the memory will be described later with reference to FIG. 5.

Figure 4:
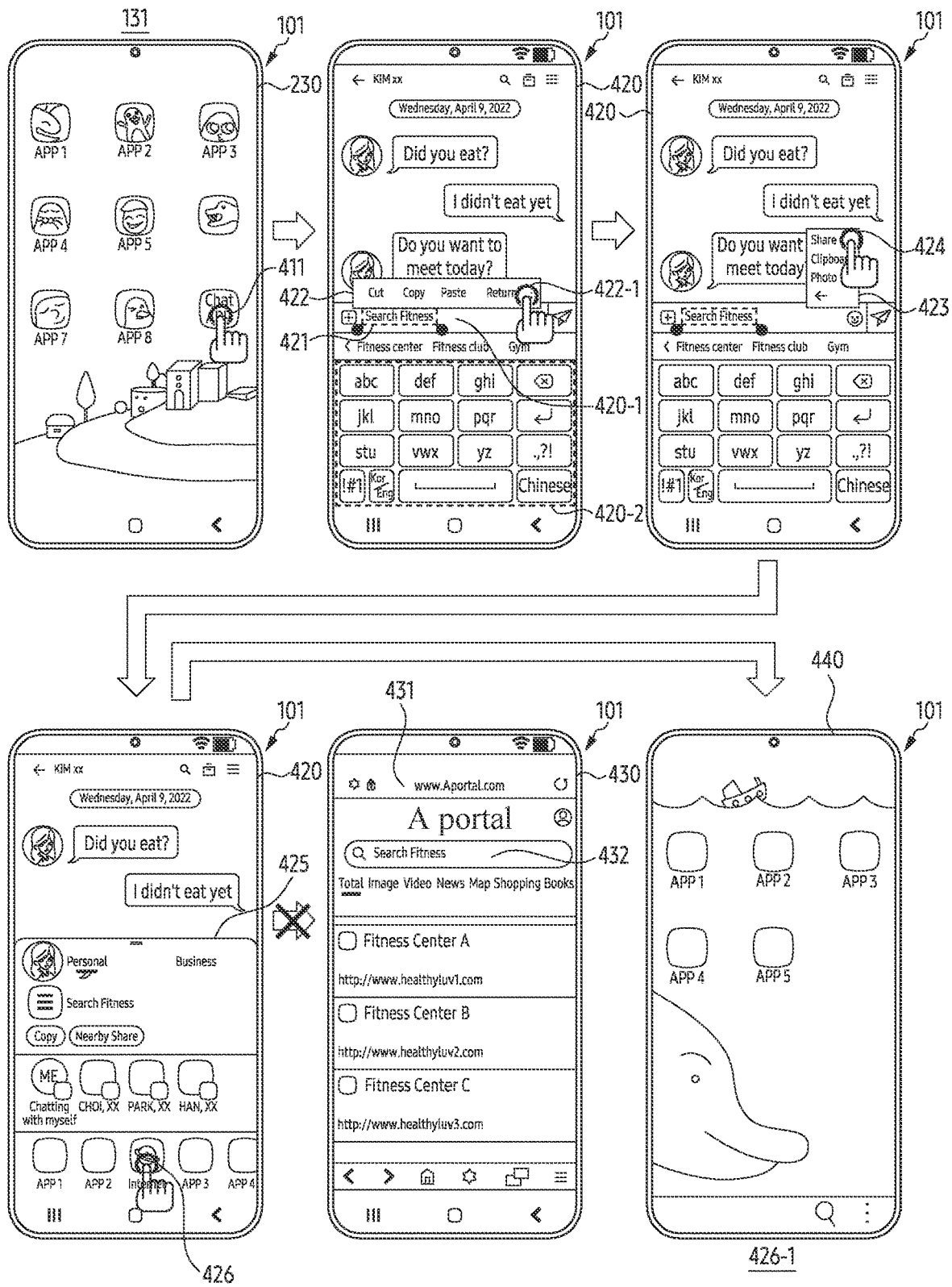
FIG. 4 is an example diagram for describing an operation of an electronic device replacing execution of an application restricted in the first launcher application with execution of another application allowed in the first launcher application, according to an embodiment of the disclosure.

FIG. 4 is an example diagram for describing an operation that the electronic device 101, instead of an application restricted in the first launcher application 131, executes replacing the application with another application allowed in the first launcher application 131 according to an embodiment of the disclosure. The electronic device 101 may be referred to as the electronic device 101 of FIG. 1. The screen 230 may be referred to as the screen 230 of FIG. 2. The first application 411 may correspond to the first application 311 of FIG. 3. The second application 426 may be included in the second application 321 of FIG. 3. The first launcher application 131 may correspond to the first launcher application 131 of FIG. 1.

The electronic device 101 according to an embodiment may receive an input of selecting one visual object among a plurality of visual objects corresponding to a plurality of applications included in the screen 230. For example, the electronic device 101 may receive an input of touching the first application 411 on the screen 230. The electronic device 101 may execute the first application 411 in response to the input. For example, the first application 411 may be an example of a chatting application.

For example, the screen 420 may be an example of a screen based on execution of the first application 411. The screen 420 may include a search window 420-1 and/or a keypad 420-2. The electronic device 101 may receive at least one input based on the keypad 420-2. The electronic device 101 may display a word or text corresponding to the input onto the search window 420-1. For example, the word 421 may be an example of a word input on the keypad 420-2 in the first application 411. The electronic device 101 may overlappingly display a pop-up window 422 on the screen 420, based on the word 421 displayed on the search window 420-1. For example, the electronic device 101 may display the pop-up window 422 superimposed on the screen 420, in response to an input of touching the word 421. The electronic device 101 may identify a continuous touch input for a designated time. The electronic device 101 may receive an input of touching the word 421 for the designated time to display, through the display, an executable pop-up window 422 for quick access capable of calling at least one function included in the first application 411.

The electronic device 101 according to an embodiment may receive an input 422-1 for displaying another pop-up window 423 in the pop-up window 422. The pop-up window 423 may include at least one of a button 424 for connecting the touched (or selected) word 421 to the first application 411 and a different application, a button for connecting the word 421 to an application used to find the meaning of the word 421, or a button for storing the word 421 in the first application 411 or a memory (e.g., the memory 130 of FIG. 1). For example, in response to an input of selecting the button 424, the electronic device 101 may display a pop-up window 425 including visual objects corresponding to a plurality of applications on the display, overlapping the screen 420. The visual objects may include at least one of an Internet application, a chat application, and/or another chat application different from the chat application.

The electronic device 101 according to an embodiment may receive an input for selecting the second application 426 included in the pop-up window 425. For example, the second application 426 may be an example of an Internet application for searching for the word 421. For example, the electronic device 101 may execute one of a plurality of Internet applications stored in the memory of the electronic device 101 in response to the input. The plurality of Internet applications may include at least one piece of the same information. In response to the input, the electronic device 101 may execute one of a plurality of applications including the same information. For example, the executed Internet application may be an example of an Internet application designated by default, based on the processor 120 of the electronic device 101.

The electronic device 101 according to an embodiment may refrain from executing the second application 426 in order to restrict displaying the screen 430 based on the execution of the second application 426. For example, the screen 430 may be an example of a search result screen obtained by searching for the word 421 using at least one Internet application. The screen 430 may include a search window 432 for searching for a word and/or text different from the word 421 and/or a domain window 431 for inputting a domain address. For example, the screen 430 may refer to a web page. For example, the electronic device 101 may receive an input for switching from the screen 430 to another different screen, using the search window 432 and/or the domain window 431. The different screen may be an example of a screen restricted by the first launcher application 131. The electronic device 101 may cease executing the second application 426 to restrict displaying of the different screen on the display.

According to an embodiment, the electronic device 101 may execute the second application 426, based on whether the second application 426 is allowed to be executed by the first launcher application 131, in response to an input of selecting the second application 426. For example, when the second application 426 is not allowed to be executed by the first launcher application 131, the electronic device 101 may execute a third application 426-1 for replacing the second application 426. The third application 426-1 may be an application allowed to be executed by the first launcher application 131 and may perform a function of the second application 426 requested by the input.

According to an embodiment, the electronic device 101 may identify the third application 426-1 for replacing the second application 426, based on instructions (or an application programming interface (API)) executed by an input that is received through the pop-up window 425 and selects the second application 426. For example, the instructions may be executed by the input, such as Intent, and may include a type and/or function of another application different from the first application 411. For example, in response to identifying, from the intent included in the instructions, a designated text (e.g., "Intent.BROWSABLE") for execution of an application different from the first application 411 and capable of browsing a web page, the electronic device 101 may identify a plurality of applications (e.g., the second application 426 or the third application 426-1) supporting browsing of the web page among applications installed in the electronic device 101. In response to identifying the third application 426-1 allowed to be executed by the first launcher application 131 among the plurality of applications, the electronic device 101 may execute the third application 426-1.

The electronic device 101 according to an embodiment may display a screen 440 allowed by the first launcher application 131 on the display, based on the third application 426-1. For example, the third application 426-1 may be an example of an Internet application using a web page (e.g., the screen 440) and/or a web site that is allowed to be accessed within the first launcher application 131. For example, the third application 426-1 may be an example of an Internet application (e.g., a kids browser) configured to allow children to browse through an accessible web page. The electronic device 101 may restrict displaying of a designated web page using the third application 426-1. For example, the electronic device 101 may change the designated web page using the user information.

As described above, instead of executing an application whose execution is ceased in the first launcher application, the electronic device may execute the application by replacing it with another application that is allowed to be executed by the first launcher application.

Figure 5:
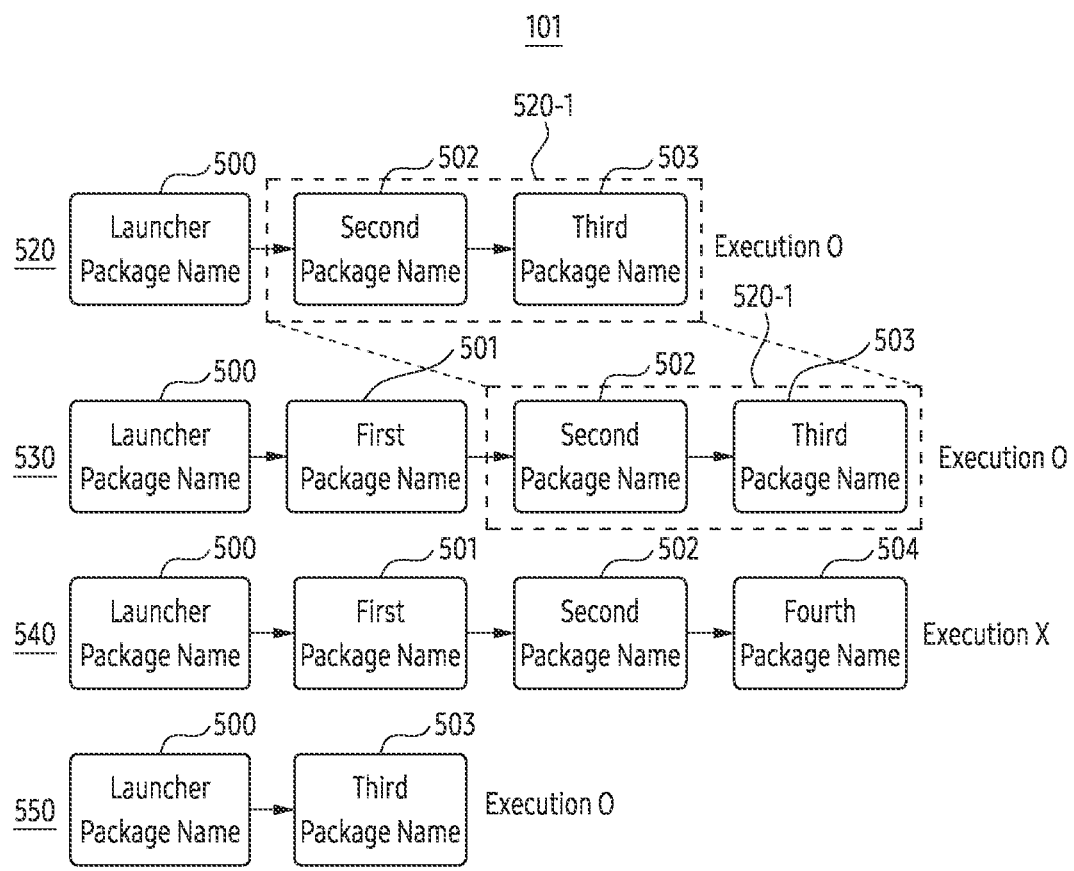
FIG. 5 is an example diagram for describing an operation of storing information by an electronic device according to an embodiment of the disclosure.

FIG. 5 is an example diagram for describing an operation of storing information by the electronic device 101 according to an embodiment of the disclosure. The electronic device 101 may correspond to the electronic device 101 of FIG. 1. A launcher package name 500 may be included in the first launcher application 131 of FIG. 1 and/or the second launcher application 132 of FIG. 1. A first package name 501 may be included in the first application 411 of FIG. 4. A second package name 502 may be included in the second application 426 of FIG. 4. A third package name 503 may be an example of a package name of an application store.

An application store (e.g., a Galaxy store) according to an embodiment may refer to an online mobile content (e.g., an application) store capable of purchasing (or installing) a certain application. The electronic device 101 may install at least one of a plurality of applications provided by the application store, based on the application store. The installed at least one application may be an example of an application of which execution is restricted in a launcher application (e.g., the first launcher application 131 of FIG. 1).

A plurality of package names 501, 502, and 503 according to an embodiment may mean information included in an application. The electronic device 101 may store, in the information, a package name (e.g., the first package name 501 to the third package name 503) as at least one sentence (e.g., package="com.thefirstapplication.myapp"). For example, the information included in the launcher application (e.g., the first launcher application 131 of FIG. 1) may include a list of applications allowed to be executed by the launcher application. Based on the application list, the electronic device 101 may adjust execution of a plurality of applications stored in the electronic device 101, in the execution state of the launcher application.

The electronic device 101 according to an embodiment may identify package names of a plurality of applications stored in the electronic device, and may allow execution thereof in the launcher application. The package names may be a text uniquely assigned to an application. The package names may be stored in a file included in an application, such as a manifest (e.g., androidmanifest.xml). The package names may be identified by an operating system (OS) stored in a memory (e.g., the memory 130 of FIG. 1) of the electronic device 101. For example, the processor 120 of the electronic device 101 may identify information of the plurality of applications stored in the memory to transmit the information to the launcher application. For example, the electronic device 101 may identify text information to restrict execution of at least one application in the launcher application, using the information of the plurality of applications. For example, the text information may include an intent filter. For example, the electronic device 101 may use the intent filter to switch from an application of execution is ceased to another application of which execution is allowed and may execute the allowed application. The launcher application (e.g., the first launcher application 131 of FIG. 1) may be an example of an application indicated by the launcher package name 500.

In response to an input of executing the at least one application, the electronic device 101 according to an embodiment may execute the at least one application, using the information of the plurality of applications, based on a framework. For example, the electronic device 101 may perform an operation according to the input received by the user, using the framework.

The electronic device 101 according to an embodiment may adjust the execution of the at least one application allowed to be executed in the launcher application, independently of using the framework, by using the information included in the at least one application. For example, the electronic device 101 may store in a memory a package name included in an application. For example, the electronic device 101 may identify sequence information that a plurality of applications are executed independently of the package name. For example, the electronic device 101 may use the sequence information to adjust execution of the at least one application in the launcher application. The electronic device 101 may store the sequence information as a resource file (or format) included in an Android application program package (e.g., a file with an extension of '.apk'). For example, the electronic device 101 may display the sequence information as shown in Table 1.

TABLE 1

| Line Number | Tag |
|---|---|
| 1 | <packages_allowed_depth> |
| 2 | <name> |
| 3 | com.app.thelauncher/<br>com.app.thesecondapplication/<br>com.app.thethirdapplication |
| 4 | </name> |
| 5 | <name>com.app.thesecondapplication/<br>com.app.thethirdapplication</name> |
| 6 | </packages_allowed_depth> |
| 7 | <packages_blocked_depth> |
| 8 | <name> |
| 9 | com.app.thelauncher/<br>com.app.thefirstapplication/<br>com.app.thesecondapplication/<br>com.app.thefourthapplication |
| 10 | </name> |
| 11 | </packages_blocked_depth> |
| 12 | <game_packages_allowed> |
| 13 | <name>com.example.game1</name> |
| 14 | </game_packages_allowed> |
| 15 | <packages_allowed_name> |
| 16 | <name>com.thethirdapplication</name> |
| 17 | <name>com.thesecondapplication</name> |
| 18 | <name>com.thefirstapplication</name> |
| 19 | </packages_allowed_name> |
| 20 | <packages_blocked_name> |
| 21 | <name>co.kr.somecompany.*</name> |
| 22 | </packages_blocked_name> |

The above Table 1 may be an example of information represented in an xml format. Referring to the Table 1, the tag of line number 1 ("<packages_allowed_depth>") may be a designated text indicating that the list of applications allowed to be executed by the launcher application starts in the resource file. The tag of line number 6 ("</packages_allowed_depth>") may be a designated text indicating that the list started by the designated text of line number 1 is completed in the resource file. Lines between line number 1 and line number 5 may include one or more tags for indicating the list, and a text wrapped by the tags. Referring to Table 1, the tag ("<name>") of the line number 2 may be a designated text indicating that the package name list used to indicate the applications allowed for the execution is started. The tag "</name>" of line number 4 may be a designated text indicating that the package name list is completed. The tag ("com.app.thelauncher/com.app.thesecondapplication/com.app.thethirdapplication") of the line number 3 may be a text that the applications indicated by each package name (e.g., com.app.thelauncher, com.app.thesecondapplication, com.app.thethirdapplication) are classified by a separator (e.g., "/" of the line number 3) according to the sequence of execution in the electronic device. For example, the tag of line number 3 may be sequence information to indicate that execution of a third application (e.g., an application indicated by "com.app.thethirdapplication") is allowed, based on execution of a second application (e.g., an application indicated by "com.app.thesecondapplication"), while a launcher application (e.g., an application indicated by "com.app.thelauncher") is executed. For example, the tag of the line number 5 may be an example of the text classified by the separator (e.g., "/" of line number 3) according to the sequence of the applications indicated by each package name being executed in the electronic device, based on ("<name>com.app.thesecondapplication/com.app.thethirdapplication</name>"). The electronic device 101 according to an embodiment may execute an application having the third package name 503 in the sequence 520, based on the line number 3.

According to an embodiment, the electronic device 101 may identify the sequence information corresponding to the sequence 520-1, based on the line number 5, in the sequence 530. The electronic device 101 may execute an application having the first package name 501 in the execution state of the launcher application to which the launcher package name 500 is assigned. The application having the first package name 501 may be an example of an application that is allowed to be executed in the launcher application, based on the line number 17 of Table 1. After executing the application having the first package name 501, the electronic device 101 may execute the application having the second package name 502. The execution of the application having the second package name 502 may be allowed by the electronic device executing the launcher application, based on the line number 18 of Table 1. The electronic device 101 may use the sequence information indicated by the line number 5 to allow the execution of the application having the third package name 503 after the execution of the application having the second package name 502.

For example, the processor of the electronic device 101 may store the sequence information in the runtime memory in the form of a data structure in the memory of the electronic device 101, independently of the sequence information matching the sequence 520-1. As in the tags [com.app.thesecondapplication, com.app.thethirdapplication], one form of the data structure may include one or more objects (e.g., collection, JavaScript Object Notation (JSON), arrangement, associated arrangement, connection list, queue, stack, and/or binary tree) indicated by interconnected texts in the memory. The processor of the electronic device 101 may receive an input of executing an application indicated by the second package name 502 and may request the memory to load sequence information matching the sequence 520-1. The loaded sequence information may be referred to as a form stored in a runtime memory.

In the sequence 520, the electronic device 101 according to an embodiment may allow execution of a different application indicated by the third package name 503, after executing the application indicated by the second package name 502, while the launcher application indicated by the launcher package name 500 is executed. For example, the electronic device 101 may execute the different application by identifying that the different application is executed, after the one application is executed, based on the sequence information stored in the memory.

The electronic device 101 according to an embodiment may store the sequence 520-1 in the processor and/or the memory of the electronic device. For example, in the sequence 530, the electronic device 101 may execute the application having the first package name 501, in the execution state of the launcher application (e.g., the first launcher application 131 of FIG. 2) indicated by the launcher package name 500, and then execute other application indicated by the second package name 502. The electronic device 101 may load the sequence information matching the sequence 520-1 from the memory, in response to the execution of the other application. The electronic device 101 may receive an input for executing another application assigned to the third package name 503, based on the execution of the other application. The electronic device 101 may allow execution of the other application using the loaded sequence information.

Referring to the Table 1 described above, the tag of the line number 7 ("<packages_blocked_depth>") may be a designated text indicating that the list of the sequence of applications not allowed to be executed by the launcher application starts in a resource file. The tag ("</packages_blocked_depth>") of the line number 11 may be a designated text indicating that the list started by the designated text of line number 7 is completed in the resource file. The lines between line number 7 and line number 11 may include one or more tags for indicating the list and texts wrapped by the tags. The tag of the line number 9 ("com.app.thelauncher/com.app.thefirstapplication/com.app.thesecondapplication/com.app.thethirdapplication") may be a text that the applications indicated by each package name are classified by a separator (e.g., "/" of the line number 3) according to the sequence of execution in the electronic device. For example, in the sequence 540, in the execution state of the launcher application indicated by the launcher package name 500, the electronic device 101 may execute another application indicated by the second package name 502, based on the execution of the application allocated to the first package name 501. The electronic device 101 may identify an input for executing other application indicated by a fourth package name 504 by the execution of the other application. The electronic device 101 may cease executing the other application based on the text described in the line number 9 of the Table 1.

Referring to the Table 1 described above, the tag of the line number 12 ("<game_packages_allowed") may be a designated text indicating that a list of package names of a game application allowed to be executed in the launcher application (e.g., the first launcher application 131 of FIG. 1) starts in a resource file. The tag of the line number 14 "</game_packages_allowed>" may be a designated text indicating that the designated text is completed in the resource file. The tag of the line number 13 ("<name>com.example.game1</name>") may be an example of the list of package names of the game application that is allowed to be executed. The tag of the line number 13 may include a list of a plurality of package names.

Referring to the Table 1 described above, the tag of line number 15 ("<packages_allowed_name>") may be a designated text indicating that a list of applications allowed to be executed in the launcher application (e.g., the first launcher application 131 of FIG. 1) starts in the resource file. The tag "</packages_allowed_name>" of the line number 19 may be a designated text indicating that the designated text is completed in the resource file. The tag of the line number 16 "<name>com.thethirdapplication</name>" may refer to a package name of at least one application stored in the electronic device 101. For example, in the sequence 550, in the execution state of the launcher application matching the launcher package name 500, the electronic device 101 may allow execution of the application corresponding to the third package name 503.

Referring to the Table 1 described above, the tag of the line number 19 ("<packages_blocked_name") may be a designated text indicating that a list of applications that are not allowed to be executed in the launcher application (e.g., the first launcher application 131 of FIG. 1) starts in the resource file. The tag of the line number 20 "</packages_blocked_name>" may be a designated text indicating that the designated text is completed in the resource file. The tag of the line number 21 ("<name>co.kr.somecompany.*</name>") may refer to a package name of at least one application stored in the electronic device 101. The tag of the line number 21 may further include a filtering operator such as '*'. For example, based on the filtering operator '*', the electronic device may cease execution of an application having a package name including "co.kr.somecompany", while executing the launcher application. A plurality of package names and/or one or more tags indicating a name of one screen displayed by an application indicated by the package name may be further included in between the line number 20 to the line number 22. However, the disclosure is not limited to the above-described embodiment.

The electronic device 101 according to an embodiment may change information included in the launcher application indicated by the launcher package name 500. For example, the electronic device 101 may change the list of applications that are not allowed to be executed in the launcher application (e.g., the first launcher application 131 of FIG. 1). For example, the electronic device 101 may change the list while updating the launcher application and/or the operating system. The electronic device 101 may cease executing the application indicated by the third package name 503 in the sequence 550, using the changed list. For example, the electronic device 101 may change the list of applications that are not allowed to be executed, based on a user input. The electronic device 101 may display a screen for requesting user information on a display (e.g., the display 140 of FIG. 1) in order to use the user input.

The electronic device 101 according to an embodiment may update the sequence information, while updating the launcher application and/or the operating system (OS) of the electronic device 101. For example, the electronic device 101 may store the sequence information corresponding to the sequence 520 and the sequence information corresponding to the sequence 520-1 in the processor and/or the memory. The electronic device 101 may adjust execution of an application allocated to the third package name 503 in the sequence 530, using the sequence information. For example, the electronic device 101 may identify sequence information preferentially executed of the sequence information. The electronic device 101 may identify the sequence information corresponding to the sequence 520 in preference to the sequence information matching the sequence 520-1.

As described above, in the execution state of the first launcher application 131, the electronic device may identify a package name included in each of the plurality of applications stored in the electronic device. The electronic device 101 may adjust the first launcher application 131 to suit a user of the electronic device 101, based on adjustment of execution of at least one application.

Figure 6:
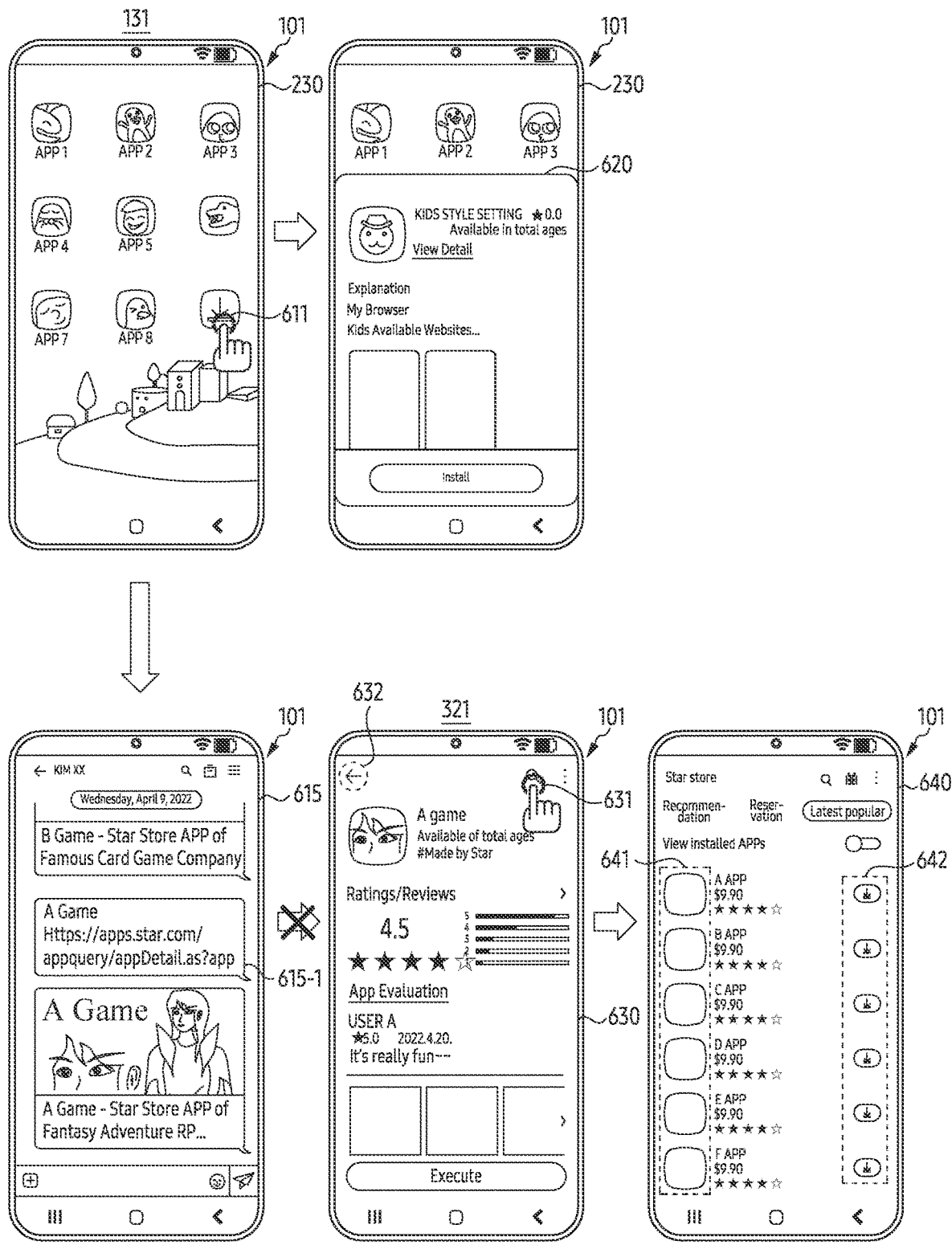
FIG. 6 is an example diagram for describing an operation of an electronic device using a pop-up window to install at least one application in the first launcher application, according to an embodiment of the disclosure.

FIG. 6 is an example diagram for describing an operation of performed by an electronic device using a pop-up window 620 to install at least one application in a first launcher application 131 according to an embodiment of the disclosure. The electronic device 101 may be referred to as the electronic device 101 of FIG. 1. The screen 230 may be referred to as the screen 230 of FIG. 2. The second application 321 may correspond to the second application 321 of FIG. 3. The second application 321 may be an example of an application store.

The electronic device 101 according to an embodiment may include at least one application 611 that needs to be installed and/or updated in the screen 230. The electronic device 101 may receive an input for selecting an icon of the application 611 to install and/or update the application 611 through at least one server. For example, the electronic device 101 may identify the application 611, based on instructions executed by an input to select an application. For example, the electronic device 101 may identify a designated text (e.g., "Intent. CATEGORY_LAUNCHER" of the Android operating system) for executing an application store (e.g., the Galaxy Store), from the intent included in the instructions. The designated text may include an intent filter.

The electronic device 101 according to an embodiment may execute the second application 321 in the electronic device 101, based on the identification of the designated text. For example, the electronic device 101 may identify the second application 321 as an application restricted by the first launcher application. The electronic device 101 may cease executing the second application 321 restricted by the first launcher application 131. For example, in response to identifying the second application 321, the electronic device 101 may display a pop-up window (e.g., the pop-up window 340 of FIG. 3) on the display.

The electronic device 101 according to an embodiment may indirectly access the second application 321 by using the screen 615 based on the screen 420 of FIG. 4. For example, the electronic device 101 may execute the second application 321 by identifying an input of touching a download link 615-1 in the screen 615.

The electronic device 101 according to an embodiment may display a screen 630 on the display based on execution of the second application 321. For example, the screen 630 may include all user interfaces (UIs) available in the second application 321. The electronic device 101 may receive an input of pressing (or selecting) a search button 631 included in the screen 630, and may display a search window. The electronic device 101 may identify an input for searching for at least one application that is not allowed to be executed in the first launcher application 131, using the search window.

For example, the electronic device 101 may switch from the screen 630 to another screen different from the screen 630, amongst the screens displayed by the second application 321, using a back button 632 included in the screen 630.

The electronic device 101 according to an embodiment may display a screen 640 on the display (e.g., the display 140 of FIG. 1), based on the search button 631 and/or the back button 632. For example, the screen 640 may be an example of a screen capable of installing applications 641 that are not allowed to be executed in the first launcher application 131. For example, the electronic device 101 may install at least one application, in response to an input of selecting the download button 642 matching the at least one application amongst the applications 641. The electronic device 101 may display the installed at least one application on the home screen (e.g., the screen 230 of FIG. 2) of the first application 131. The electronic device 101 may execute the at least one application, independently of information included in the first launcher application 131, in the execution state of the first launcher application 131. The information may include a list of applications that are not allowed to be executed in the first launcher application 131. For example, the at least one application may be included in the list.

The electronic device 101 according to an embodiment may identify an input for executing the second application 321 to display the pop-up window 620, overlappingly on the screen 230, so as to restrict displaying of the screen 630. For example, the pop-up window 620 may be an example of a quick install page (QIP). The pop-up window 620 may include some of UIs available in the second application 321. For example, the electronic device 101 may exclude the search button 631 and/or the back button 632 from the pop-up window 620 and may display the same on the display. However, the disclosure is not limited to the above-described embodiment. For example, the electronic device 101 may install an application that is allowed to be executed in the first launcher application 131, using the pop-up window 620. The electronic device 101 may use the pop-up window 620 to prevent installation of the application that is not allowed to be executed in the first launcher application 131. The electronic device 101 may use the sequence information (e.g., the sequence 520 of FIG. 5) and/or the pop-up window 620 to adjust the application allowed to be executed in the first launcher application 131.

As described above, the electronic device may restrictively install an application, using a pop-up window, in the launcher application (e.g., the first launcher application 131) that allows execution of some applications stored in the electronic device. Hereinafter, an operation in which the electronic device 101 switches from the first launcher application 131 to the second launcher application 132 will be described in detail with reference to FIG. 7.

Figure 7:
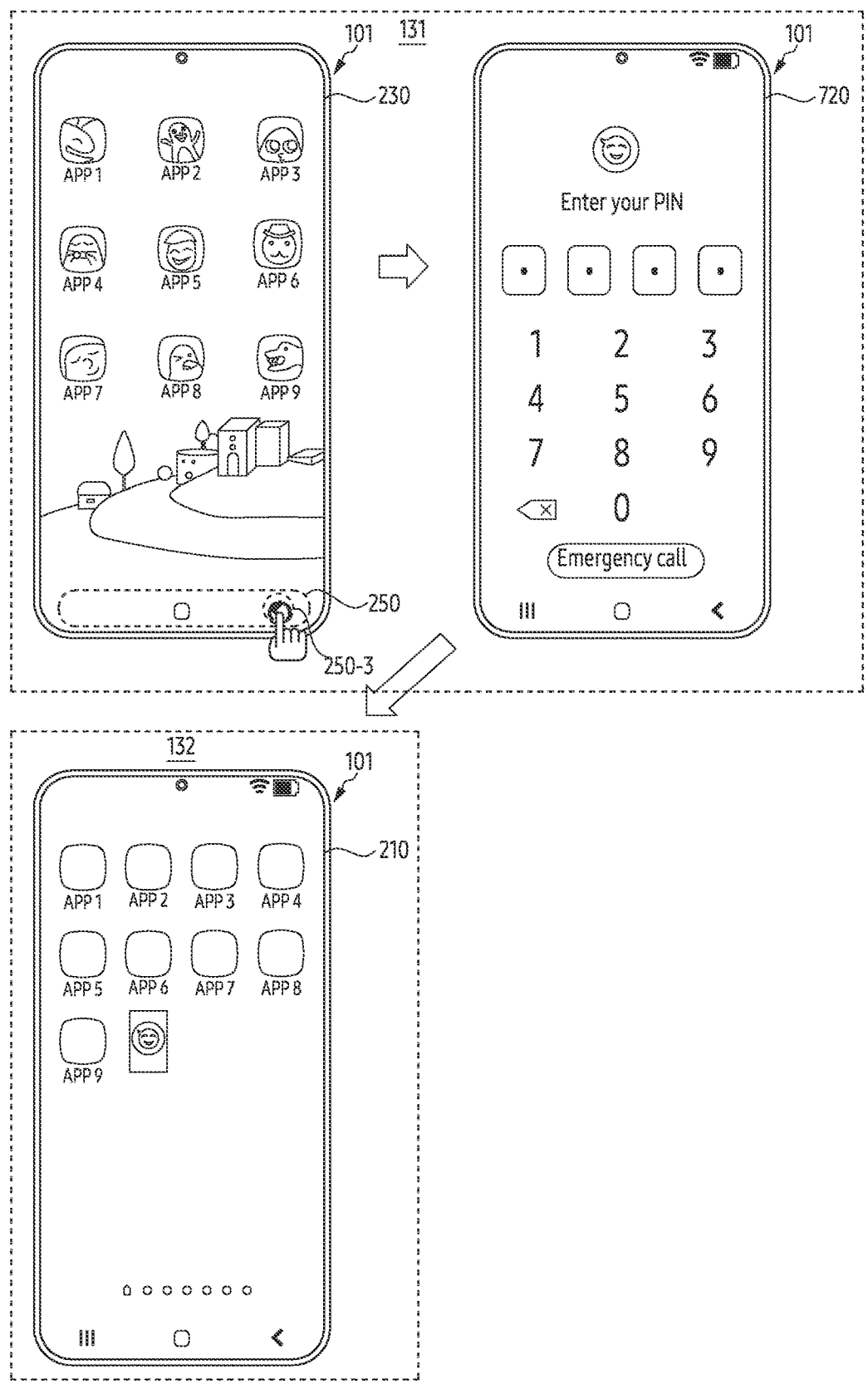
FIG. 7 is an example diagram for describing an operation of terminating the first launcher application by an electronic device according to an embodiment of the disclosure.

FIG. 7 is an example diagram for describing an operation of the electronic device 101 terminating the first launcher application 131 according to an embodiment of the disclosure. The electronic device 101 may correspond to the electronic device of FIG. 1. The screen 230 may be referred to as the screen 230 of FIG. 2. The navigation bar 250 may be referred to as the navigation bar 250 of FIG. 2. The back button 250-3 may match the back button 250-3 of FIG. 2.

The electronic device 101 according to an embodiment may include at least one fingerprint sensor. For example, the fingerprint sensor may be arranged in the display (e.g., the display 140 of FIG. 1) of the electronic device 101. For example, the fingerprint sensor may be arranged in at least one of a plurality of physical buttons included in the electronic device 101. The electronic device 101 according to an embodiment may store multiple fingerprint information of the user, using the fingerprint sensor. For example, the electronic device 101 may store the multiple fingerprint information in an area distinguished from the memory. For example, the electronic device 101 may store the multiple fingerprint information in the processor (e.g., the processor 120 of FIG. 2). However, the disclosure is not limited to the above-described embodiment.

The electronic device 101 according to an embodiment may store user information in the processor. For example, the user information may include at least one of multiple fingerprint information, a lock pattern, a password, a personal identification number (PIN), information for iris recognition, information for face recognition, or information for speech recognition. For example, the electronic device 101 may set a locking function to a plurality of applications stored in the electronic device 101. For example, the electronic device 101 may request user information for using the application for which the locking function is set. For example, the application with the locking function set may include a first launcher application 131. The electronic device 101 may receive an input for using the first launcher application 131 to display a screen for requesting the user information on the display (e.g., the display 140 of FIG. 1). For example, the electronic device 101 may receive an input for adjusting the type and/or the number of applications included in the home screen (e.g., the screen 230) of the first launcher application 131, and may display a screen for requesting the user information. For example, the electronic device 101 may identify the user information to change an application that is allowed to be executed in the first launcher application 131.

The electronic device 101 according to an embodiment may receive an input for selecting the back button 250-3, in the screen 230. For example, the electronic device 101 may terminate the first launcher application 131 in response to the input for selecting the back button 250-3 in the screen 230. For example, the electronic device 101 may receive an input for terminating the first launcher application 131 and may display a screen 720 of requesting the user information on the display. The screen 720 may include screens for inputting multiple fingerprint information, a lock pattern, a password, iris recognition, facial recognition, voice recognition, and/or a PIN. The electronic device 101 may identify a signal of inputting the user information in the screen 720 to terminate the first launcher application 131. For example, the electronic device 101 may execute the second launcher application 132 in response to terminating the first launcher application 131. For example, the electronic device 101 may switch from the first launcher application 131 to the second launcher application 132. For example, the electronic device 101 may execute the first launcher application 131 in an overlapping manner, while the second launcher application 132 is executed. The screen 220 may be an example of a home screen of the second launcher application 132.

As described above, the electronic device may set at least one application (e.g., the first launcher application 131 of FIG. 2) to a locked state. The electronic device may unlock the locked state to use the application. The electronic device may display a screen for requesting the user information from the user to unlock the locked state. The electronic device may unlock the application by identifying that the user information is input.

Figure 8:
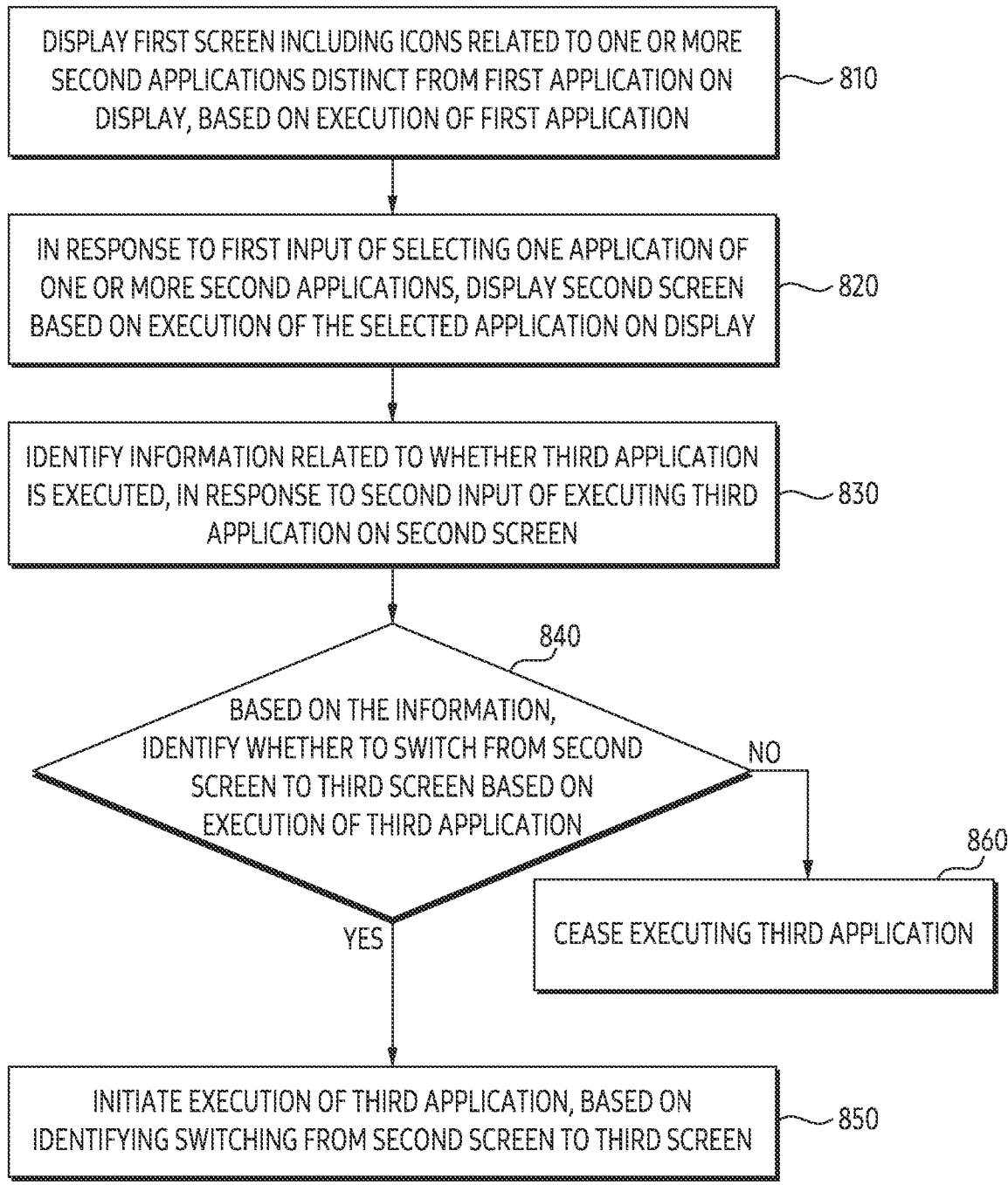
FIG. 8 is a flowchart illustrating an operation of initiating execution of an application according to an execution sequence of applications, based on information, by an electronic device according to an embodiment of the disclosure.

FIG. 8 is a flowchart illustrating an operation of an electronic device initiating execution of an application according to an execution sequence of applications, based on information according to an embodiment of the disclosure. The electronic device may correspond to the electronic device 101 of FIG. 1. At least one of the operations of FIG. 8 may be performed by the electronic device 101 of FIG. 1 and/or the processor 120 of FIG. 1.

Referring to FIG. 8, in operation 810, the processor according to an embodiment may display a first screen including icons related to one or more second applications distinct from the first application on the display, based on execution of the first application. For example, the processor may display the first screen including a list of the one or more second applications distinct from the first application, on the display based on the first application. For example, the first application may correspond to the first launcher application 131 of FIG. 1. The display may be referred to as the display 140 of FIG. 1. The first screen may correspond to the screen 230 of FIG. 2. The second applications may mean applications included in the screen 230 of FIG. 2. The second applications may be examples of applications that are allowed to be executed in the first launcher application, respectively. For example, the processor may display a screen including a plurality of applications on the display, using at least one launcher application.

Referring to FIG. 8, in operation 820, in response to a first input of selecting one application of the one or more second applications, the processor according to an embodiment may display a second screen based on execution of the selected application on the display. The first input may include a gesture of selecting any one of icons displayed in the list in operation 810. For example, one application of the one or more second applications may be referred to as the first application 311 of FIG. 3. The second screen may mean the screen 320 of FIG. 3. For example, the processor may execute one application included in the home screen of the launcher application to display a screen based on the one application on the display.

Referring to FIG. 8, in operation 830, the processor may identify information related to whether the third application is executed, in response to a second input of executing the third application on the second screen. The third application may correspond to the second application 321 of FIG. 3. The information related to whether the third application is executed may be identified from the information of the first application. The information may include sequence information corresponding to the sequences 520, 530, 540, and 550 of FIG. 5. For example, in response to the execution of the second application, the processor may load the information from the memory to identify the sequence information.

Referring to FIG. 8, in operation 840, based on the information, the processor according to an embodiment may identify whether to switch from the second screen to a third screen based on execution of the third application. For example, in response to identifying the sequence information included in the information, the processor may identify whether to allow execution of the third application, from the second screen based on the execution of the second application. For example, the sequence information may include information for allowing execution of the third application after the second application is executed. Based on the sequence information, the processor may identify whether the third application based on execution of the second application is a third application included in the sequence information. Based on the identification, the processor may determine whether to switch from the second screen to the third screen.

Referring to FIG. 8, in response to switching to the third screen (Yes in operation 840), the processor according to an embodiment may, in operation 850, initiate execution of the third application, based on identifying switching from the second screen to the third screen. For example, when the sequence information includes information for switching from the second screen to the third screen, the processor may initiate execution of the third application, using the sequence information while the second application is being executed.

Referring to FIG. 8, in response to not switching to the third screen (No in 840), the processor according to an embodiment may, in operation 860, cease executing the third application. For example, the processor may provide information for notifying of ceasing of the execution of the third application. The third application may be an example of an application that is not allowed to be executed, in the execution state of the first application. For example, the sequence information may not include switching from the second screen to the third screen. The information for notifying the ceasing may include a form such as e.g., the pop-up window 340 of FIG. 3.

Figure 9:
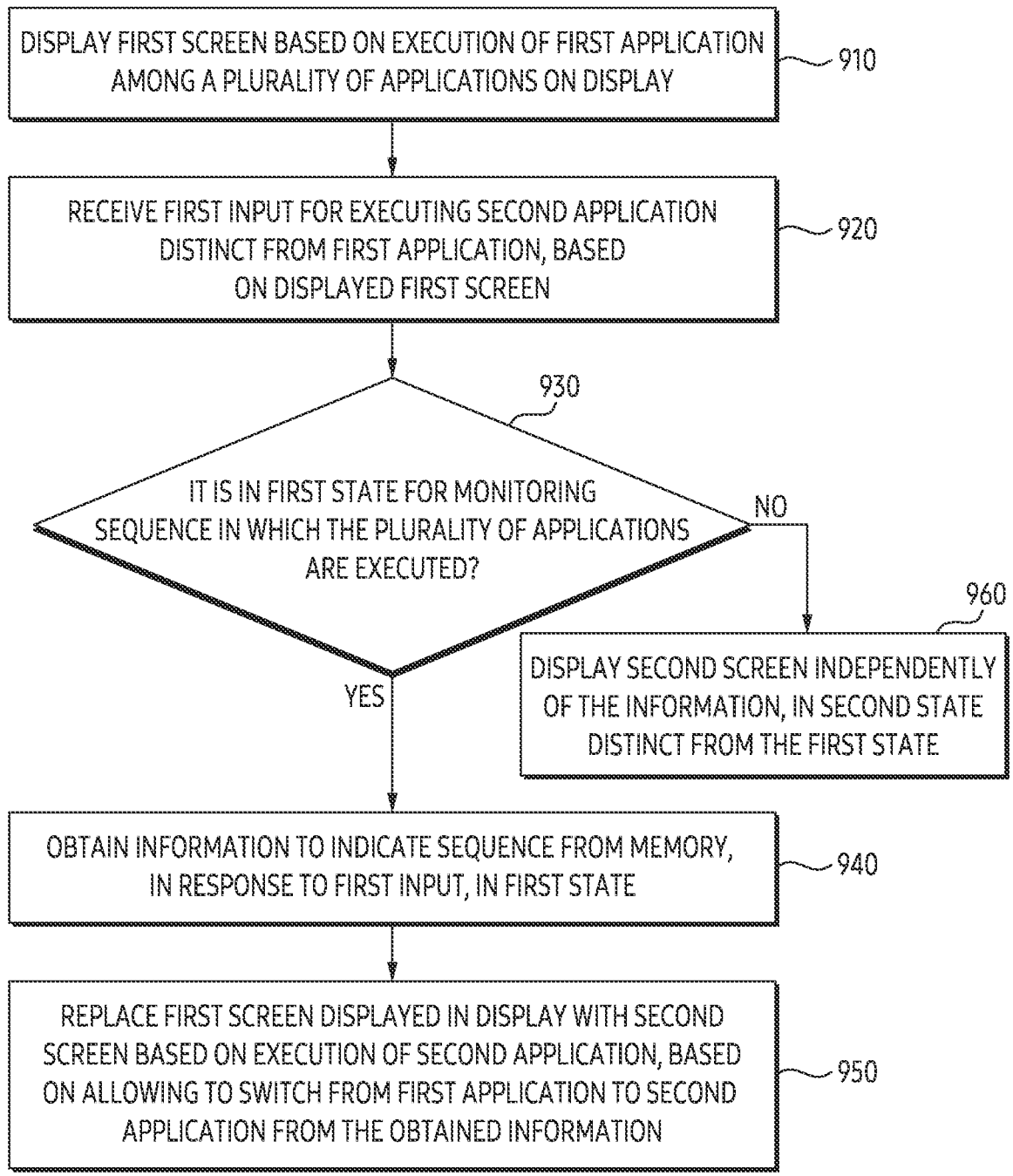
FIG. 9 is a flowchart illustrating an operation of initiating execution of an application in a first state, based on the information, by an electronic device according to an embodiment of the disclosure.

FIG. 9 is a flowchart illustrating an operation of an electronic device initiating execution of an application in a first state, based on information according to an embodiment of the disclosure. The electronic device may correspond to the electronic device 101 of FIG. 1. At least one of the operations of FIG. 9 may be performed by the electronic device 101 of FIG. 1 and/or the processor 120 of FIG. 1.

Referring to FIG. 9, in operation 910, the processor according to an embodiment may display a first screen based on execution of a first application amongst a plurality of applications on a display (e.g., the display 140 of FIG. 1). For example, the plurality of applications may refer to applications included in the screen 230 of FIG. 2. The first application may correspond to the first application 311 of FIG. 3. The first screen may correspond to the screen 320 of FIG. 3.

In operation 920, the processor according to an embodiment may receive a first input for executing a second application distinct from the first application, based on the displayed first screen. For example, the second application may correspond to the second application 321 of FIG. 3. The operation of receiving the first input may mean receiving an input of selecting a visual object matching the second application included in the first screen.

In operation 930, the processor according to an embodiment may identify whether it is in a first state for monitoring a sequence in which the plurality of applications are executed. The first state may refer to an execution state of the first launcher application 131 of FIG. 1.

In response to identifying that the electronic device is in the first state (Yes in operation 930), in operation 940, the processor according to an embodiment may obtain the information to indicate the sequence from the memory (e.g., the memory 130 of FIG. 1), in response to the first input in the first state. The information indicating the sequence may include sequence information corresponding to the sequences 520 to 550 of FIG. 5.

In operation 950, the processor according to an embodiment may replace the first screen displayed in the display with a second screen based on execution of the second application, based on allowing to switch from the first application to the second application from the obtained information. The second screen may be referred to as the screen 330 of FIG. 3. For example, the processor may identify whether the execution of the second application based on the execution of the first application is mapped to the sequence information, using the sequence information. When it is mapped to the sequence information, the processor may switch from a first screen based on the first application to a second screen based on execution of the second application. For example, when it is not mapped to the sequence information, the processor may display a pop-up window (e.g., the pop-up window 340 of FIG. 3) on the display, overlapping the first screen.

In response to identifying that it does not correspond to the first state (No in operation 930), in operation 960, the processor according to an embodiment may display the second screen independently of the information, in a second state distinct from the first state. For example, the second state may refer to the execution state of the second launcher application 132 of FIG. 1. The second state may be an example of a state that allows execution of all applications stored in the electronic device.

Figure 10:
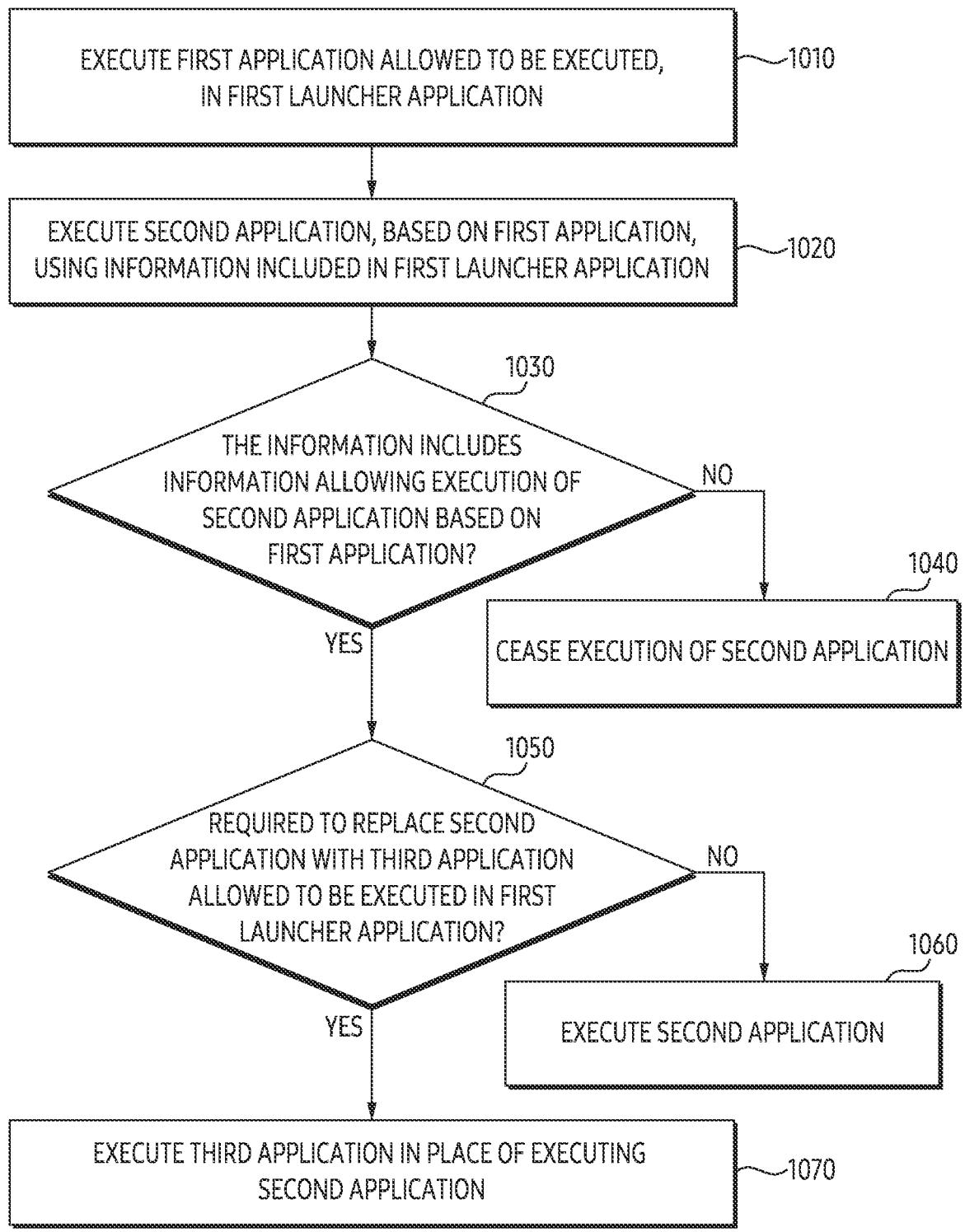
FIG. 10 is a flowchart illustrating an operation of controlling execution of an application by using information by an electronic device according to an embodiment of the disclosure.

FIG. 10 is an example flowchart illustrating an operation of an electronic device for controlling execution of an application, using information according to an embodiment of the disclosure. The electronic device may correspond to the electronic device 101 of FIG. 1. At least one of the operations of FIG. 10 may be performed by the electronic device 101 of FIG. 1 and/or the processor 120 of FIG. 1.

Referring to FIG. 10, in operation 1010, the processor according to an embodiment may execute the first application that is allowed to be executed in the first launcher application. For example, the first launcher application may be referred to the first launcher application 131 of FIG. 1. The first application may correspond to the first application 311 of FIG. 3.

Referring to FIG. 10, in operation 1020, the processor may execute the second application, based on the first application, using information included in the first launcher application. For example, the information may be expressed in a format such as an extended marked-up language (xml). The information may include a list of applications allowed to be executed in the first launcher application. The information may include information indicating a sequence in which a plurality of applications are executed in the execution state of the first launcher application. The information may be stored in the memory (e.g., the memory 130 of FIG. 1) of the electronic device. The processor of the electronic device may request the memory to load the information.

Referring to FIG. 10, in operation 1030, the processor may identify whether the information includes information for allowing execution of the second application, based on the first application. For example, the information may include the sequence information corresponding to the sequences 520, 530, 540, and 550 of FIG. 5. The processor may receive an input of executing the second application, through a screen based on the execution of the first application. The processor may identify receiving of the input to identify whether the input matches the information.

Referring to FIG. 10, in response to identification of including the information (Yes in operation 1030), in operation 1050 the processor according to an embodiment may identify whether it is necessary to replace the second application with a third application that is allowed to be executed in the first launcher application. For example, the third application may correspond to the third application 426-1 of FIG. 4. The processor may identify the third application that is allowed to be executed in the first launcher application, in response to an input of executing the second application. For example, the second application and the third application may include the same information. The same information may include a designated text for executing an application capable of viewing a web page.

In response to having to replace with the third application (Yes in operation 1030), in operation 1070, the processor according to an embodiment may execute the third application in place of executing the second application. For example, when it is not necessary to replace with the third application (No in operation 1050), in operation 1060, the processor may execute the second application. For example, the second application may be an example of an application that is allowed to be executed in the first launcher application.

According to an embodiment, the processor may cease executing the second application in operation 1040, in response to identifying that the information does not include information allowing execution of the second application based on the first application (No in operation 1030).

The processor according to an embodiment may update the first launcher application and/or the operating system, using at least one server and/or an external electronic device (e.g., the external electronic device 170 of FIG. 1) through at least one communication circuitry (e.g., the communication circuitry 160 of FIG. 1). For example, the processor may change the information through the update. The changed information may be an example of information in which a list of applications executable in the first launcher application is changed.

As described above, the electronic device may adjust the type and/or the number of applications distinguished from the application allowed to be executed in at least one launcher application, using the information included in the electronic device. The electronic device may control execution of at least one application in the at least one launcher application to prevent useless contents from being provided to the user of the electronic device.

For displaying a list of applications stored in an electronic device as a visual object, there may be needs for a method for controlling execution of the stored applications within a launcher application.

The electronic device can identify a sequence in which a plurality of applications are executed in a launcher application, thereby allowing or restricting execution of at least one of the plurality of applications.

As described above, an electronic device (e.g., the electronic device 101 of FIG. 1) according to an embodiment may include a display (e.g., the display 140 of FIG. 1), a memory (e.g., the memory 130 of FIG. 1) for storing instructions, and at least one processor (e.g., the processor 120 of FIG. 1) operably coupled to the display 140 and the memory 130. When the instructions are executed, the at least one processor 120 may display, in the display, a first screen (e.g., the screen 230 of FIG. 2) including a list of one or more second applications distinct from the first application, based on a first application (e.g., the first launcher application 131 of FIG. 1). When the instructions are executed, in response to a first input of selecting one application (e.g., the first application 311 of FIG. 3) amongst the one or more second applications based on the list, the at least one processor may display a second screen (e.g., the screen 320 of FIG. 3) based on execution of the selected one application on the display. When the instructions are executed, the at least one processor may identify information (e.g., the sequence 520 of FIG. 5) indicating at least one application switchable from the second screen in the first application, in response to a second input of executing a third application (e.g., second application 321 of FIG. 3), based on the second screen. When the instructions are executed, the at least one processor may identify whether to switch from a second screen 320 to a third screen (e.g., the screen 330 of FIG. 3)

based on the execution of the third application, based on the information. When the instructions are executed, the at least one processor may initiate execution of the third application, based on identifying switching from the second screen to the third screen.

For example, when the instructions are executed, the at least one processor may display the first screen amongst screens including the first screen and a list of entire applications stored in the electronic device, based on an input of selecting a home button (e.g., the home button 250-2 of FIG. 2) in a navigation bar (e.g., the navigation bar 250 of FIG. 2) displayed in the display, while executing the first application. The first screen may be stored in the electronic device. The first screen may include one or more visual objects indicating the one or more second applications that are allowed to be executed in the first application.

For example, when the instructions are executed, the at least one processor may display, overlappingly on the first screen, a fourth screen (e.g., the pop-up window 620 of FIG. 6) for downloading one application related to a third input based on a designated fourth application, in response to the third input for downloading one application of the one or more second applications in the electronic device, in the list. The fourth screen may be a screen allowed to be displayed by the information of the first application, amongst screens displayable by the fourth application.

For example, when the instructions are executed, based on the information, the at least one processor may refrain from executing the fourth application, in response to an input of executing the fourth application stored in the electronic device, while executing the first application.

For example, the information may include a list of applications allowed to be executed in the first application while the first application is executed. The first application may include meta data for displaying at least a portion of a list of the second applications as a visual object, in the first screen.

For example, when the instructions are executed, the at least one processor may receive a fourth input for changing the visual object corresponding to at least a portion of the list of the second applications included in the first screen. In response to the fourth input, the at least one processor may display a fifth screen (e.g., the screen 720 of FIG. 7) for authenticating a user who provided the fourth input, overlappingly on the first screen.

For example, when the instructions are executed, in response to the second input, the at least one processor may identify a filter indicated by the second input, and the third application amongst a plurality of applications stored in the electronic device, based on the information.

For example, when the instructions are executed, the at least one processor may identify the third application, by comparing the filter and a text stored in meta data of the one or more second applications. When the instructions are executed, the at least one processor may classify all applications stored in the electronic device according to types of the applications, by using the filter.

For example, when the instructions are executed, the at least one processor may update the first application when the instructions are executed. When the instructions are executed, the at least one processor may be configured to change the information based on updating the first application and store the information in the memory.

For example, when the instructions are executed, the at least one processor may display a sixth screen (e.g., the screen 720 of FIG. 7) for authenticating a user who provided the fifth input, overlappingly on the first screen, in response to a fifth input to terminate the first application, while the first application is executed.

As described above, a method of an electronic device (e.g., the electronic device 101 of FIG. 1) according to an embodiment may include displaying a first screen (e.g., the screen 230 of FIG. 2) including a list of one or more second applications distinct from a first application in a display (e.g., the display 140 of FIG. 1) based on the first application (e.g., the first launcher application 131 of FIG. 1). The method of the electronic device may include displaying a second screen (e.g., the screen 320 of FIG. 3) based on execution of the selected application in the display, in response to a first input of selecting one application (e.g., the first application 311 of FIG. 3) amongst the one or more second applications, based on the list. The method of the electronic device may include identifying information (e.g., the sequence 520 of FIG. 5) indicating at least one application switchable from the second screen in the first application, in response to a second input of executing a third application (e.g., the second application 321 of FIG. 3), based on the second screen. The method of the electronic device may include identifying whether to switch from the second screen to a third screen (e.g., the screen 330 of FIG. 3) based on execution of the third application, based on the information. The method may include initiating execution of the third application, based on identifying switching from the second screen to the third screen.

For example, the displaying the first screen may include displaying the first screen among the first screen and the screen including a list of the entire applications stored in the electronic device, based on an input of selecting a home button (e.g., the home button 250-2 of FIG. 2) of a navigation bar (e.g., the navigation bar 250 of FIG. 2) displayed within the display, while executing the first application. The first screen may include one or more visual objects indicating the one or more second applications allowed to be executed in the first application.

For example, the displaying the first screen may include displaying, overlappingly on the first screen, a fourth screen (e.g., the pop-up window 620 of FIG. 6) for downloading an application related to a third input based on a designated fourth application, in response to the third input for downloading the application of the one or more second applications in the electronic device, in the list. The fourth screen may be a screen allowed to be displayed by the information of the first application amongst screens displayable by the fourth application.

For example, the displaying the first screen may include refraining from executing the fourth application, in response to an input of executing the fourth application, stored in the electronic device, while executing the first application, based on the information.

For example, the information may include a list of applications allowed to be executed in the first application, while the first application is executed. The first application may include meta data for displaying a portion of a list of the second applications as a visual object in the first screen.

For example, the method of the electronic device may include receiving a fourth input for changing the visual object corresponding to at least a portion of a list of the second applications included in the first screen. The method of the electronic device may include, in response to the fourth input, displaying a fifth screen (e.g., the screen 720 of FIG. 7) for authenticating a user who provided the fourth input, overlappingly on the first screen.

For example, the method of the electronic device may include identifying, in response to the second input, a filter indicated by the second input, and the third application amongst a plurality of applications stored in the electronic device, based on the information.

For example, the method of the electronic device may include identifying the third application by comparing a text stored in metadata of the one or more second applications and the filter. The method of the electronic device may include classifying all applications stored in the electronic device according to types of applications, using the filter.

For example, the method of the electronic device may include updating the first application. The method of the electronic device may include changing the information based on the update and storing the information in a memory.

For example, the method of the electronic device may include, while the first application is executed, displaying, overlappingly on the first screen, a sixth screen (e.g., the screen 720 of FIG. 7) for authenticating the user who provided a fifth input, in response to the fifth input for terminating the first application.

As described above, an electronic device (e.g., the electronic device 101 of FIG. 1) according to an embodiment may include a display (e.g., the display 140 of FIG. 1), a memory (e.g., the memory 130 of FIG. 1) for storing instructions, and at least one processor (e.g., the processor 120 of FIG. 1) operably coupled to the display and the memory. When the instructions are executed, the at least one processor may display, in the display, a first screen (e.g., the screen 320 of FIG. 3) based on execution of a first application (e.g., the first application 311 of FIG. 3) among a plurality of applications. When the instructions are executed, the at least one processor may receive a first input for executing a second application (e.g., the second application 321 of FIG. 3) distinct from the first application, based on the displayed first screen. When the instructions are executed, the at least one processor, in a first state (e.g., the execution state of the first launcher application 131 of FIG. 1) for monitoring a sequence in which the plurality of applications are executed, may obtain information indicating the sequence from the memory, in response to the first input. When the instructions are executed, the at least one processor may replace the first screen displayed in the display with a second screen (e.g., the screen 330 of FIG. 3) based on execution of the second application, based on allowing to switch from the first application to the second application from the obtained information. When the instructions are executed, the at least one processor may display the second screen independently of the information in a second state (e.g., the execution state of the second launcher application 132 of FIG. 1) distinct from the first state.

For example, when the instructions are executed, the at least one processor may display, in the first state, a third screen (e.g., the screen 230 of FIG. 2) based on the first state amongst screens including a list of entire applications stored in the electronic device, based on a second input of selecting a home button (e.g., the home button 250-2 of FIG. 2) of a navigation bar (e.g., the navigation bar 250 of FIG. 2) displayed in the display. The third screen may include visual objects indicating one or more third applications that are allowed to be executed in the first state.

For example, the first state may be a state of refraining from executing some of one or more applications stored in the electronic device, and the second state may be a state in which the entire applications stored in the electronic device are allowed to be executed.

For example, the information may include a list of applications allowed to be executed in the first state. When the instructions are executed, in the first state, the at least one processor may refrain from executing a fourth application, in response to a third input for executing the fourth application stored in the electronic device, based on the information.

For example, when the instructions are executed, the at least one processor may, in response to the execution of the second application, initiate execution of one application allowed to be executed replacing the execution of the second application in the first state, among the plurality of applications stored in electronic device, based on the information and a filter indicated by the first input.

For example, when the instructions are executed, the at least one processor may identify the second application by comparing a text stored in meta data of at least one application that is allowed to be executed and the filter, in the first state. When the instructions are executed, the at least one processor may use the filter to classify entire applications stored in the electronic device according to types of the applications.

For example, when the instructions are executed, the at least one processor may receive a fourth input for switching from the first state to the second state. The at least one processor may, when the instructions are executed, in response to the fourth input, display a fourth screen (e.g., the screen 720 of FIG. 7) for inputting authentication information of the user who inputted the fourth input, overlappingly on the third screen.

As described above, a method of an electronic device (e.g., the electronic device 101 of FIG. 1) according to an embodiment may include displaying a first screen (e.g., the screen 320 of FIG. 3) based on execution of a first application (e.g., the first application 311 of FIG. 3) amongst a plurality of applications, in a display (e.g., the display 140 of FIG. 1). The method of the electronic device may include receiving a first input for executing a second application (e.g., the second application 321 of FIG. 3) different from the first application, based on the displayed first screen. The method of the electronic device, in a first state (e.g., an execution state of the first launcher application 131 of FIG. 1) for monitoring a sequence in which the plurality of applications are executed, may include obtaining information indicating the sequence from a memory (e.g., the memory 130 of FIG. 1), in response to the first input. The method of the electronic device may include replacing the first screen displayed in the display with a second screen (e.g., the screen 330 of FIG. 3) based on execution of the second application, based on allowing to switch from the first application to the second application from the obtained information. The method of the electronic device may include displaying the second screen independently of the information in a second state (e.g., an execution state of the second launcher application 132 of FIG. 1) different from the first state.

For example, in the first state, the method of the electronic device may include displaying a third screen (e.g., the screen 230 of FIG. 2) based on the first state amongst screens including a list of entire applications stored in the electronic device, based on a second input for selecting a home button (e.g., the home button 250-1 of FIG. 2) of a navigation bar (e.g., the navigation bar 250 of FIG. 2) displayed in the display. The third screen may include visual objects indicating one or more third applications that are allowed to be executed, in the first state.

For example, the first state may be a state that refrains execution of some of one or more applications stored in the electronic device. The second state may be a state that allows execution of the entire applications stored in the electronic device.

For example, the information may include a list of applications allowed to be executed in the first state. The method of the electronic device may, based on the information, in the first state, include refraining from executing the fourth application, in response to a third input for executing the fourth application, stored in the electronic device.

For example, the method of the electronic device, in response to execution of the second application, may include initiating execution of one application allowed to be executed, in the first state, among a plurality of applications stored in the electronic device, replacing execution of the second application, based on the information and a filter indicated by the first input.

For example, the method of the electronic device may include identifying the second application by comparing a filter and a text stored in metadata of at least one application allowed to be executed, in the first state. The filter may classify entire applications stored in the electronic device according to types of the applications.

For example, the method of the electronic device may include receiving a fourth input for switching from the first state to the second state. The method of the electronic device may include, in response to the fourth input, displaying a fourth screen (e.g., the screen 720 of FIG. 7) for inputting authentication information of a user who inputted the fourth input, overlappingly on the third screen.

The above-described devices may be implemented as hardware components, software components, and/or a combination of hardware components and software components. For example, the devices and components described in the embodiments may be implemented using one or more general-purpose computers or special-purpose computers, such as a processor, a controller, an arithmetic logic unit (ALU), a digital signal processor, a microcomputer, a field programmable gate array (FPGA), a programmable logic unit (PLU), a microprocessor, or any other device capable of executing and responding to instructions. The processing device may perform an operating system (OS) and one or more software applications performed on the operating system. Also, the processing device may access, store, manipulate, process, and generate data in response to the execution of the software. For convenience of understanding, it may be described that one processing device is used. However, those skilled in the art may understand that the processing device may include a plurality of processing elements and/or a plurality of types of processing elements. For example, the processing device may include a plurality of processors or one processor and one controller. In addition, other processing configurations such as parallel processors are also possible.

The electronic device according to various embodiments of the disclosure may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

Various embodiments as set forth herein may be implemented as software including one or more instructions that are stored in a storage medium that is readable by a machine (e.g., an electronic device 101). For example, a processor (e.g., a processor 120) of the machine (e.g., an electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a compiler or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., a compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities, and some of the multiple entities may be separately disposed in other component. According to various embodiments of the disclosure, one or more of the above-described components may be omitted, or one or more other components may be added. Alternatively or additionally, a plurality of components (e.g., modules or programs) may be integrated into a single component. In such a case, according to various embodiments of the disclosure, the integrated component may still perform one or more functions of each of the plurality of components in the same or similar manner as they are performed by a corresponding one of the plurality of components before the integration. According to various embodiments of the disclosure, operations performed by the module, the program, or another component may be carried out sequentially, in parallel, repeatedly, or heuristically, or one or more of the operations may be executed in a different sequence or omitted, or one or more other operations may be added.

The software may include a computer program, a code, an instruction, or a combination of one or more thereof, and may configure a processing device to operate as desired or may independently or collectively instruct the processing device. Software and/or data may be interpreted by a processing device or may be embodied in any type of machine, component, physical device, computer storage medium, or device to provide a command or data to the processing device. Software may be distributed on a networked computer system and stored or executed in a distributed manner. Software and data may be stored in one or more computer-readable recording media.

The method according to an embodiment may be implemented in the form of program commands executable by various computer means and recorded on a computer-readable medium. In such a case, the medium may continue to store a computer-executable program or temporarily store the program for execution or download. Further, the medium may be various recording means or storage means in which a single piece of hardware or a plurality of pieces of hardware are combined, and the medium is not limited to a medium directly connected to a computer system, and may be distributed on a network. Examples of the medium may include a magnetic medium such as a hard disk, a floppy disk, and a magnetic tape, an optical recording medium such as a compact disc read only memory (CD-ROM) and a digital versatile disc (DVD), a magneto-optical medium such as a floptical disk, and a read only memory (ROM), a random access memory (RAM), a flash memory, etc. configured to store program instructions. Further, examples of other media may include recording media or storage media managed by an application store that distributes applications, a site that supplies or distributes various other software, a server, and the like.

While various embodiments have been described with reference to limited embodiments and drawings, it will be understood by those having ordinary skill in the art that various changes in form and details may be made from the foregoing description. For example, even if the described techniques are performed in a different sequence from the described method, and/or components such as the described system, structure, device, circuit, etc. are combined or combined in a different form from the described method, or are replaced or substituted by other components or equivalents, appropriate results may be achieved.

While the disclosure has been shown and described with reference to various embodiments thereof, it will be understood by those skilled in the art that various changes in form and details may be made therein without departing from the scope of the disclosure as defined by the appended claims and their equivalents.

What is claimed is:

1. An electronic device comprising:
   a display;
   memory storing instructions; and
   at least one processor operably coupled to the display and the memory,
   wherein the instructions that, when executed by the at least one processor individually or collectively, cause the electronic device to:
   display a first screen including a list of one or more second applications in the display based on execution of a first application, the second applications being different from the first application,
   execute, in response to a first user input of selecting one of the one or more second applications, the selected second application in the display, based on information indicating a name of the selected second application included in an allowed name list, the allowed name list indicating that execution of an application of which a name included in the allowed name list is allowed while the first application is executed,
   receive, through a second screen based on the execution of the selected second application, a second user input executing a third application, and
   in response to the second user input, regardless of a name of the third application:
   execute the third application, based on the information indicating sequence of executions of the second application and the third application which is executed after the execution of the second application is included in an allowed depth list, and
   refrain from executing the third application, based on the information indicating the sequence of executions of the second application and the third application which is executed after the execution of the second application is included in a blocked depth list.

2. The electronic device of claim 1,
   wherein the instructions that, when executed by the at least one processor individually or collectively, further cause the electronic device to:
   display the first screen among the first screen and a screen including an entire list of applications stored in the electronic device, based on a user input of selecting a home button of a navigation bar displayed in the display, while executing the first application, and
   wherein the first screen includes one or more visual objects indicating the one or more second applications allowed to be executed within the first application.

3. The electronic device of claim 2,
   wherein the instructions that, when executed by the at least one processor individually or collectively, further cause the electronic device to:
   display, by overlapping on the first screen, a fourth screen for downloading an application related to a third user input based on a fourth application stored in the electronic device, in response to the third user input for downloading the one application of the one or more second applications in the electronic device, in the list, and
   wherein the fourth screen is a screen allowed to be displayed by the information of the first application, among screens displayable by the fourth application.

4. The electronic device of claim 1, wherein the instructions that, when executed by the at least one processor individually or collectively, further cause the electronic device to:
   based on the information indicating the sequence is included in the blocked depth list, execute an allowed application instead of the execution of the third application, a type of the allowed application corresponding to a type of the third application.

5. The electronic device of claim 1,
   wherein the instructions, when executed by the at least one processor individually or collectively, cause the electronic device to;
   based on the information indicating the sequence is included in the blocked depth list, display, by overlapping on the second screen, a pop-up screen for providing information indicating that the execution of the third application is blocked.

6. The electronic device of claim 5, wherein the instructions that, when executed by the at least one processor individually or collectively, further cause the electronic device to:
   display, the second screen including a link for executing the third application for downloading another application,
   receive the second user selecting the link, and
   in response to the second user input, identify whether to execute the third application based on the sequence.

7. The electronic device of claim 1, wherein the instructions that, when executed by the at least one processor individually or collectively, further cause the electronic device to:
   identify the third application among a plurality of applications stored in the electronic device, based on a filter indicated by the second user input and the information, in response to the second user input.

8. The electronic device of claim 7, wherein the instructions that, when executed by the at least one processor individually or collectively, further cause the electronic device to:
- identify the third application, by comparing the filter and a text stored in meta data of the one or more second applications, and
- classify all applications stored in the electronic device according to types of the applications, by using the filter.

9. The electronic device of claim 1, wherein the instructions that, when executed by the at least one processor individually or collectively, further cause the electronic device to:
- replace execution of an application selected by another user input with an allowed application of which a type is corresponding to a type of the application selected by the another user input, in response to a name of the selected application being in a blocked name list, the blocked name list indicating that execution of an application of which a name included in the blocked name list is not allowed while the first application is executed.

10. The electronic device of claim 1, wherein the instructions that, when executed by the at least one processor individually or collectively, further cause the electronic device to;
- identify another input for terminating the first application, during the execution of the first application, and
- display, by overlapping on the first screen, another screen for authenticating a user, during execution of the first application.

11. A method of an electronic device, the method comprising:
- displaying a first screen including a list of one or more second applications in a display, based on execution of a first application, the second applications being distinct from the first application;
- executing, in response to a first user input of selecting one of the one or more second applications, the selected second application in the display, based on information indicating a name of the selected second application included in an allowed name list, the allowed name list indicating that execution of an application of which a name included in the allowed name list is allowed while the first application is executed;
- receiving, through a second screen based on the execution of the selected second application, a second user input executing a third application;
- in response to the second user input, regardless of a name of the third application:
- executing the third application, based on the information indicating sequence of executions of the second application and the third application which is executed after the execution of the second application is included in an allowed depth list; and
- refraining from executing the third application, based on the information indicating the sequence of executions of the second application and the third application which is executed after the execution of the second application is included in a blocked depth list.

12. The method of claim 11,
wherein the displaying the first screen includes displaying the first screen among the first screen and the screen including an entire list of applications stored in the electronic device, based on a user input of selecting a home button of a navigation bar displayed within the display, while executing the first application, and
wherein the first screen includes one or more visual objects indicating the one or more second applications allowed to be executed within the first application.

13. The method of claim 12,
wherein the displaying the first screen includes displaying, by overlapping on the first screen, a fourth screen for downloading an application related to a third user input based on a fourth application stored in the electronic device, in response to the third user input for downloading the application of the one or more second applications in the electronic device in the list, and
wherein the fourth screen is a screen allowed to be displayed by the information of the first application, among screens displayable by the fourth application.

14. The method of claim 11, comprising:
based on the information indicating the sequence is included in the blocked depth list, executing an allowed application instead of the execution of the third application, a type of the allowed application corresponding to a type of the third application.

15. The method of claim 11, comprising:
based on the information indicating the sequence is included in the blocked depth list, displaying, by overlapping on the second screen, a pop-up screen for providing information indicating that the execution of the third application is blocked.

16. The method of claim 15, comprising:
displaying, the second screen including a link for executing the third application for downloading another application,
receiving the second user selecting the link, and
in response to the second user input, identifying whether to execute the third application based on the sequence.

17. The method of claim 11, comprising:
identifying the third application among a plurality of applications stored in the electronic device, based on a filter indicated by the second user input and the information, in response to the second user input.

18. The method of claim 17, comprising:
identifying the third application, by comparing the filter and a text stored in meta data of the one or more second applications, and
classifying all applications stored in the electronic device according to types of the applications, by using the filter.

19. The method of claim 11, comprising:
replacing execution of an application selected by another user input with an allowed application of which a type is corresponding to a type of the application selected by the another user input, in response to a name of the selected application being in a blocked name list, the blocked name list indicating that execution of an application of which a name included in the blocked name list is not allowed while the first application is executed.

20. The method of claim 11, comprising:
identifying another input for terminating the first application, during the execution of the first application, and
displaying, by overlapping on the first screen, another screen for authenticating a user, during execution of the first application.

* * * * *